US010470124B2

(12) United States Patent
Tanaka et al.

(10) Patent No.: US 10,470,124 B2
(45) Date of Patent: Nov. 5, 2019

(54) INFORMATION PROCESSING DEVICE, COMMUNICATION SYSTEM, INFORMATION PROCESSING METHOD, AND PROGRAM

(71) Applicant: SONY CORPORATION, Tokyo (JP)

(72) Inventors: Yusuke Tanaka, Tokyo (JP); Yuichi Morioka, Kanagawa (JP); Takeshi Itagaki, Saitama (JP)

(73) Assignee: SONY CORPORATION, Tokyo (JP)

( * ) Notice: Subject to any disclaimer, the term of this patent is extended or adjusted under 35 U.S.C. 154(b) by 35 days.

(21) Appl. No.: 15/565,486

(22) PCT Filed: Mar. 25, 2016

(86) PCT No.: PCT/JP2016/059557
§ 371 (c)(1),
(2) Date: Oct. 10, 2017

(87) PCT Pub. No.: WO2016/178342
PCT Pub. Date: Nov. 10, 2016

(65) Prior Publication Data
US 2018/0084500 A1 Mar. 22, 2018

(30) Foreign Application Priority Data
May 7, 2015 (JP) .................. 2015-094717

(51) Int. Cl.
*H04L 12/28* (2006.01)
*H04W 52/02* (2009.01)
(Continued)

(52) U.S. Cl.
CPC ... *H04W 52/0235* (2013.01); *H04W 52/0212* (2013.01); *H04W 52/0216* (2013.01);
(Continued)

(58) Field of Classification Search
None
See application file for complete search history.

(56) References Cited

U.S. PATENT DOCUMENTS

2006/0285526 A1* 12/2006 Jang .................. H04W 52/0216
370/338
2007/0159992 A1* 7/2007 Kim .................. H04W 52/0216
370/311
(Continued)

FOREIGN PATENT DOCUMENTS

JP 2005-197798 A 7/2005
JP 2010-093441 A 4/2010
(Continued)

OTHER PUBLICATIONS

International Search Report dated Jun. 21, 2016, in PCT/JP2016/059557 filed Mar. 25, 2016.
(Continued)

*Primary Examiner* — Sithu Ko
(74) *Attorney, Agent, or Firm* — Xsensus LLP

(57) ABSTRACT

An information processing device includes a control section. The control section performs control to transmit data to another device that can receive data from a device of a data transmission source without transmitting thereto notification information indicating that the other device can receive the data upon transition from a function pause state to a data receivable state. In this case, if the other device is determined to be in the data receivable state, the control section of the information processing device performs control to transmit the data to the other device without receiving the notification information therefrom. Power consumption can thereby be reduced.

17 Claims, 19 Drawing Sheets

(51) Int. Cl.
*H04W 74/04* (2009.01)
*H04W 84/12* (2009.01)
*H04W 74/06* (2009.01)

(52) U.S. Cl.
CPC ........... *H04W 74/04* (2013.01); *H04W 84/12* (2013.01); *H04W 74/06* (2013.01); *Y02D 70/00* (2018.01); *Y02D 70/142* (2018.01); *Y02D 70/164* (2018.01); *Y02D 70/166* (2018.01); *Y02D 70/168* (2018.01); *Y02D 70/21* (2018.01); *Y02D 70/22* (2018.01)

(56) References Cited

U.S. PATENT DOCUMENTS

| | | | | |
|---|---|---|---|---|
| 2013/0229963 | A1* | 9/2013 | Asterjadhi | H04W 74/085 370/311 |
| 2014/0086200 | A1* | 3/2014 | Seok | H04W 72/02 370/330 |
| 2014/0204960 | A1* | 7/2014 | Park | H04L 12/4633 370/474 |
| 2014/0328238 | A1* | 11/2014 | Seok | H04W 74/04 370/311 |
| 2015/0009879 | A1 | 1/2015 | Kim et al. | |
| 2015/0085780 | A1 | 3/2015 | Kim et al. | |
| 2015/0103767 | A1 | 4/2015 | Kim et al. | |
| 2015/0110061 | A1* | 4/2015 | Park | H04W 74/04 370/329 |
| 2015/0163666 | A1* | 6/2015 | Jeong | H04W 8/26 370/311 |
| 2015/0319700 | A1 | 11/2015 | Oteri et al. | |
| 2016/0219512 | A1* | 7/2016 | Asterjadhi | H04W 52/0274 |
| 2016/0337968 | A1* | 11/2016 | Park | H04W 52/0216 |

FOREIGN PATENT DOCUMENTS

| | | |
|---|---|---|
| JP | 2013-247479 A | 12/2013 |
| JP | 2015-511080 A | 4/2015 |
| WO | 2014/071308 A1 | 5/2014 |

OTHER PUBLICATIONS

Extended European Search Report issued in corresponding application No. 16789478.1, dated Nov. 20, 2018, 10 pages.

* cited by examiner

EXAMPLE OF IE (Non-Polling Delivery Information Element) GIVING
NOTIFICATION OF SUPPORT FOR NON-TRIGGERED TRANSMISSION Traffic Indication Virtual Bitmap (TIVB)

EXAMPLE OF TIM FRAME FORMAT

HOW TIVB IS TYPICALLY RELATED TO PVB

Traffic Indication Virtual Bitmap (TIVB)

| | 1octet | 1octet | 1octet | |
|---|---|---|---|---|
| AID | 1 2 3 4 5 6 7 8 | 9 10 11 12 13 14 15 16 | 17 18 19 20 21 22 23 24 | 2008 |
| TIVB bit | 1 1 1 1 1 1 1 1 | 1 1 1 1 1 1 1 1 | 0 0 1 1 0 0 0 1 | ... 0 |

Partial Virtual Bitmap (PVB)

| | 1octet | 1octet | 1octet |
|---|---|---|---|
| AID | 1 2 3 4 5 6 7 8 | 9 10 11 12 13 14 15 16 | 17 18 19 20 21 22 23 24 |
| PVB bit | 1 1 1 1 1 1 1 1 | 1 1 1 1 1 1 1 1 | 0 0 1 1 0 0 0 1 |

EXAMPLE OF GENERATING NPDB BASED ON PVB

EXAMPLE OF GENERATING NPIB BASED ON PVB

EXAMPLE OF BITMAP IN WHICH AIDS SHARING
SAME TRANSMISSION INFORMATION ARE GROUPED

FIG. 10

EXTENDED EXAMPLE OF TIM FRAME FORMAT

| ELEMENT ID | Length | DTIM Count | DTIM Period | Bitmap Control | Partial Virtual Bitmap | Non-Polling Delivery Bitmap | Non-Polling Information Bitmap |
|---|---|---|---|---|---|---|---|
| 211 | 212 | 213 | 214 | 215 | 216 | 217 | 218 |
| 1 | 1 | 1 | 1 | 1 | 1-251 | 1-251 | 1-2008 |

FIG. 11
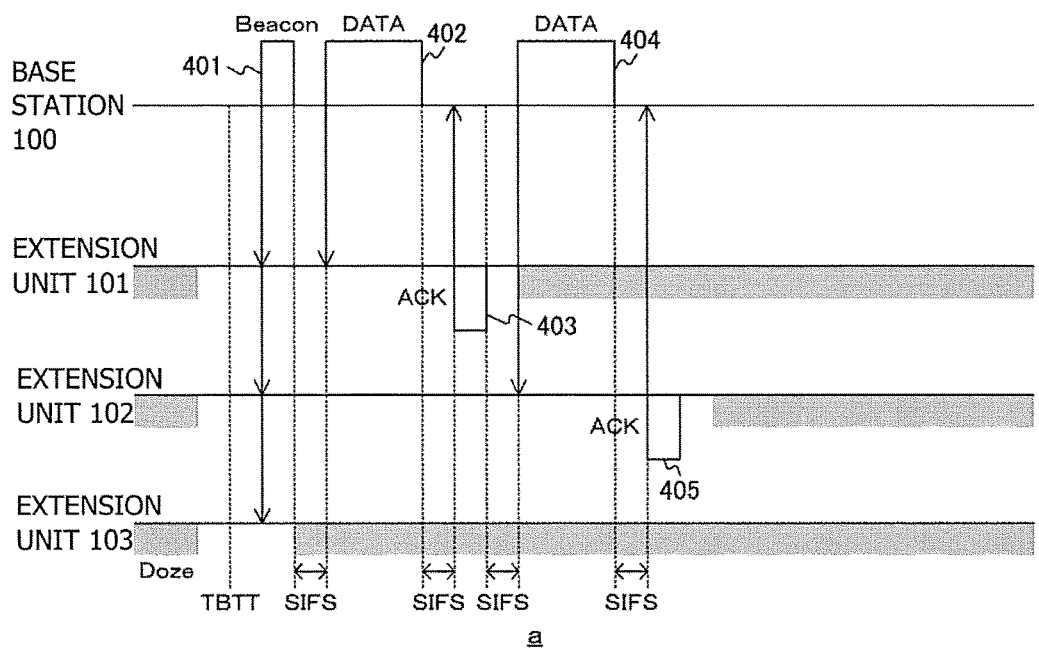
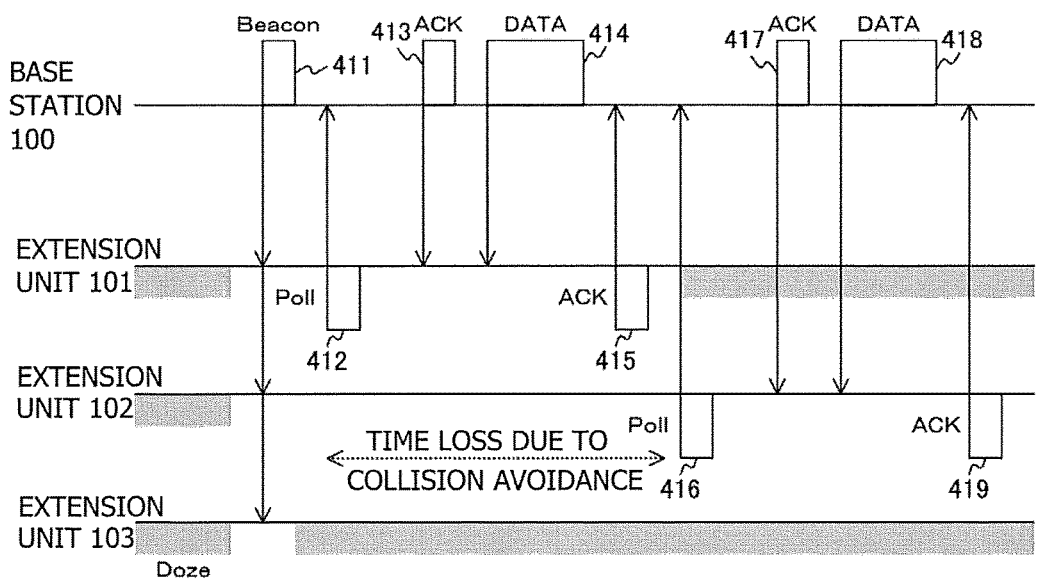

EXAMPLE OF DATA TRANSMISSION IN FREQUENCY DIVISION MULTIPLEX

EXAMPLE OF DATA TRANSMISSION WITH Aggregation

EXAMPLE OF DATA TRANSMISSION IN TIME DIVISION MULTIPLEX

INFORMATION PROCESSING DEVICE, COMMUNICATION SYSTEM, INFORMATION PROCESSING METHOD, AND PROGRAM

TECHNICAL FIELD

The present technology relates to an information processing device. More particularly, the technology relates to an information processing device, a communication system, and an information processing method for transmitting and receiving information using wireless communication, as well as to a program for causing a computer to execute the method.

BACKGROUND ART

There exist wireless communication techniques for transmitting and receiving information using wireless communication. For example, communication methods have been proposed for transmitting and receiving information between information processing devices using a wireless local area network (LAN).

If the information processing device is a mobile object, for example, a battery is often used as its power source. That means it is important to reduce power consumption in order to prolong the operating time of the information processing device. Thus the Institute of Electrical and Electronic Engineers (IEEE), which is a wireless LAN standardization organization, has proposed in its IEEE 802.11 standards techniques for allowing the information processing device, when not required to communicate, to transition from a normally active awake state to a doze state in which signals are not transmitted or received. The techniques are intended to reduce power consumption.

With the proposed techniques, an extension unit in the doze state enters the awake state at regular intervals to determine, using a signal from its base station, whether or not the base station is buffering any data destined for the own device. The signal is a traffic indication map (TIM) in a beacon frame. If it is determined that data destined for the own device is buffered, the extension unit transmits a data request frame named a Power Save Poll (PS-Poll) to the base station to receive the data therefrom. After receiving the data, the extension unit returns to the doze state. The PS-Poll frame constitutes information that communicates both the awake state of the extension unit and its data transmission request.

If there are multiple extension units, they may transmit multiple PS-Poll frames. With multiple PS-Poll frames transmitted concurrently, a collision avoidance algorithm may be activated, which may lead to a time loss.

As another example, upon receipt of a PS-Poll frame from an extension unit, the base station transmits data to that extension unit in response to the frame. In this case, no other extension unit is allowed to carry out its transmission while the data transmission is underway. As a result, it can take more time for the other extension units to return to the doze state, which may increase their power consumption.

There have been proposed techniques for reducing the time loss resulting from the avoidance of PS-Poll collision and from the ongoing communication by some other extension unit. For example, there has been proposed a data transmission and reception system that sets the time at which each extension unit is allowed to transmit a PS-Poll frame, the system notifying the extension units of such time settings beforehand to avoid PS-Poll collision (e.g., see PTL 1).

CITATION LIST

Patent Literature

[PTL 1]
Japanese Patent Laid-open No. 2005-197798

SUMMARY

Technical Problem

With the above-outlined existing techniques, the base station first notifies each extension unit of buffered data using a beacon, before receiving a PS-Poll frame from the extension unit. Each extension unit notifies the base station beforehand of a beacon cycle in which the extension unit enters the awake state. That is, in response to a beacon notification, each extension unit transmits a PS-Poll frame to indicate that the own device is in the awake state. Such PS-Poll redundancy can reduce the duration of the doze state and lead to a failure to lower power consumption.

The present technology has been devised in view of the above circumstances. An object of the technology is therefore to reduce power consumption.

Solution to Problem

The present technology has been devised to solve the above problem. According to a first aspect of the present technology, there are provided an information processing device, an information processing method, and a program for causing a computer to execute the method, the information processing device including a control section configured in such a manner that if another device that can receive data from a device of a data transmission source without transmitting thereto notification information indicating that the other device can receive the data upon transition from a function pause state to a data receivable state is determined to be able to receive the data, the control section performs control to transmit the data to the other device without receiving the notification information therefrom. This provides an effect such that if the other device is determined to be in the data receivable state, the control section transmits the data to the other device without receiving the notification information therefrom.

Also according to the first aspect of the present technology, the control section may perform control to transmit the data to the other device at the time the other device is determined to have transitioned from the function pause state to the data receivable state. This provides an effect such that the control section transmits the data to the other device at the time the other device is determined to have transitioned from the function pause state to the data receivable state.

Also according to the first aspect of the present technology, the control section may determine that the other device has transitioned from the function pause state to the data receivable state on the basis of information communicated beforehand from the other device, the information being about a cycle in which the function pause state is exited. This provides an effect such that the other device is determined to have transitioned from the function pause state to the data receivable state in accordance with the information communicated beforehand from the other device indicating the cycle in which the function pause state is exited.

Also according to the first aspect of the present technology, the control section may perform control to notify the other device that the data will be transmitted thereto at the time the other device is determined to have transitioned from the function pause state to the data receivable state. This provides an effect such that the other device is notified that the data will be transmitted thereto at the time the other device is determined to have transitioned from the function pause state to the data receivable state.

Also according to the first aspect of the present technology, the control section may give the notification using a beacon frame or another frame transmitted after the beacon frame. This provides an effect such that the notification is given using a beacon frame or another frame transmitted after the beacon frame.

Also according to the first aspect of the present technology, if the control section transmits the data to multiple other devices, the control section may give the notification to all these devices. This provides an effect such that if the data is transmitted to multiple other devices, all these devices are given the notification.

Also according to the first aspect of the present technology, the control section may give the notification using a bitmap generated on the basis of a partial virtual bitmap (PVB). This provides an effect such that the notification is given using a bitmap generated in accordance with the PVB.

Also according to the first aspect of the present technology, the control section may perform control to notify the other device of at least either a transmission method or a transmission timing for performing the data transmission, in addition to information indicating that the data will be transmitted to the other device at the time the other device is determined to have transitioned from the function pause state to the data receivable state. This provides an effect such that the other device is notified of at least either the transmission method or the transmission timing for performing the data transmission, in addition to the information indicating that the data will be transmitted to the other device at the time the other device is determined to have transitioned from the function pause state to the data receivable state.

Also according to the first aspect of the present technology, the control section may notify the other device of the transmission method in terms of at least either a frequency channel to be used for the data transmission in frequency division multiplex or the number of packets destined for the other device from among aggregated packets to be transmitted. This provides an effect such that the other device is notified of at least either the frequency channel to be used for the data transmission in frequency division multiplex or the number of packets destined for the other device from among aggregated packets to be transmitted. According to a second aspect of the present technology, there are provided an information processing device, an information processing method, and a program for causing a computer to execute the method, the information processing device including a control section configured in such a manner as to notify another device beforehand that the information processing device can receive data from a device of a data transmission source without transmitting thereto notification information indicating that the information processing device can receive data upon transition from a function pause state to a data receivable state, the control section further performing control to receive the data from the other device at the time the information processing device transitions from the function pause state to the data receivable state. This provides an effect such that the data is received from the other device at the time the information processing device transitions from the function pause state to the data receivable state.

Also according to the second aspect of the present technology, the control section may perform control to receive the data from the other device after receiving therefrom information indicating that the data will be transmitted at the time the information processing device transitions from the function pause state to the data receivable state. This provides an effect such that the data is received from the other device following receipt therefrom of the information indicating that the data will be transmitted at the time the information processing device transitions from the function pause state to the data receivable state.

Also according to the second aspect of the present technology, if at least either a transmission method or a transmission timing in which the other device transmits the data is designated, the control section may perform control to wait for receiving the data from the other device in accordance with at least either the designated transmission method or the designated transmission timing. This provides an effect such that if at least either the transmission method or the transmission timing in which the other device transmits the data is designated, the receipt of the data from the other device is awaited in accordance with at least either the designated transmission method or the designated transmission timing.

Also according to the second aspect of the present technology, if the transmission method is designated in terms of a frequency channel to be used for the data transmission in frequency division multiplex, the control section may perform control to receive the data transmitted on the designated frequency channel in the frequency division multiplex. This provides an effect such that if the frequency channel to be used for the data transmission in frequency division multiplex is designated, the data transmitted on the designated frequency channel in frequency division multiplex is received.

Also according to the second aspect of the present technology, if the transmission method is designated in terms of the number of packets destined for the information processing device from among aggregated packets to be transmitted, the control section may perform control to receive the packets destined for the information processing device until the designated number of packets is reached, the control section further causing the information processing device to transition to the function pause state after the reception. This provides an effect such that if the number of packets destined for the information processing device from among aggregated packets to be transmitted is designated, the packets destined for the information processing device are received until the designated number of packets is reached, the information processing device being made to transition to the function pause state after the reception.

Also according to the second aspect of the present technology, if the transmission timing is designated, the control section may perform control to cause the information processing device to transition to the function pause state except at the designated transmission timing. This provides an effect such that if the transmission timing is designated, the information processing device is caused to transition to the function pause state except at the designated transmission timing.

According to a third aspect of the present technology, there are provided a communication system, an information processing method, and a program for causing a computer to execute the method, the communication system including a first information processing device and a second information processing device. The first information processing device is configured in such a manner as to notify the second information processing device that the first information processing device can receive data from a device of a data transmission source without transmitting thereto notification information indicating that the first information processing device can receive data upon transition from a function pause state to a data receivable state, the first information processing device further receiving the data from the second information processing device at the time the first information processing device transitions from the function pause state to the data receivable state. The second information processing device is configured in such a manner that if the first information processing device is determined to be in the data receivable state, the second information processing device transmits the data to the first information processing device without receiving the notification information therefrom. This provides an effect such that the first information processing device receives the data from the second information processing device upon transition from the function pause state to the data receivable state after making the notification to the second information processing device and that if the first information processing device is determined to be in the data receivable state, the second information processing device transmits the data to the first information processing device without receiving the notification information therefrom.

Advantageous Effects of Invention

The present technology provides the major effect of reducing power consumption. The advantageous effects outlined above are not limitative of the present disclose. Further advantages of the disclosure will be apparent from the ensuing description.

BRIEF DESCRIPTION OF DRAWINGS

FIG. 10 is a schematic diagram depicting a typical frame format of the TIM transmitted from the base station 100 to extension units in the embodiment of the present technology.

FIG. 11 is a schematic diagram depicting the flow of data transmitted and received between devices in the embodiment of the present technology.

DESCRIPTION OF EMBODIMENTS

Described below are the preferred modes for implementing the present technology (called the embodiments hereunder). The description will be given under the following headings:

1. Embodiments (examples in which a base station notifies an extension unit of the existence of data using a beacon, before transmitting the data to the extension unit without getting triggered by the latter)
2. Applications 1. Embodiments (Configuration Example of Communication System)

Figure 1:
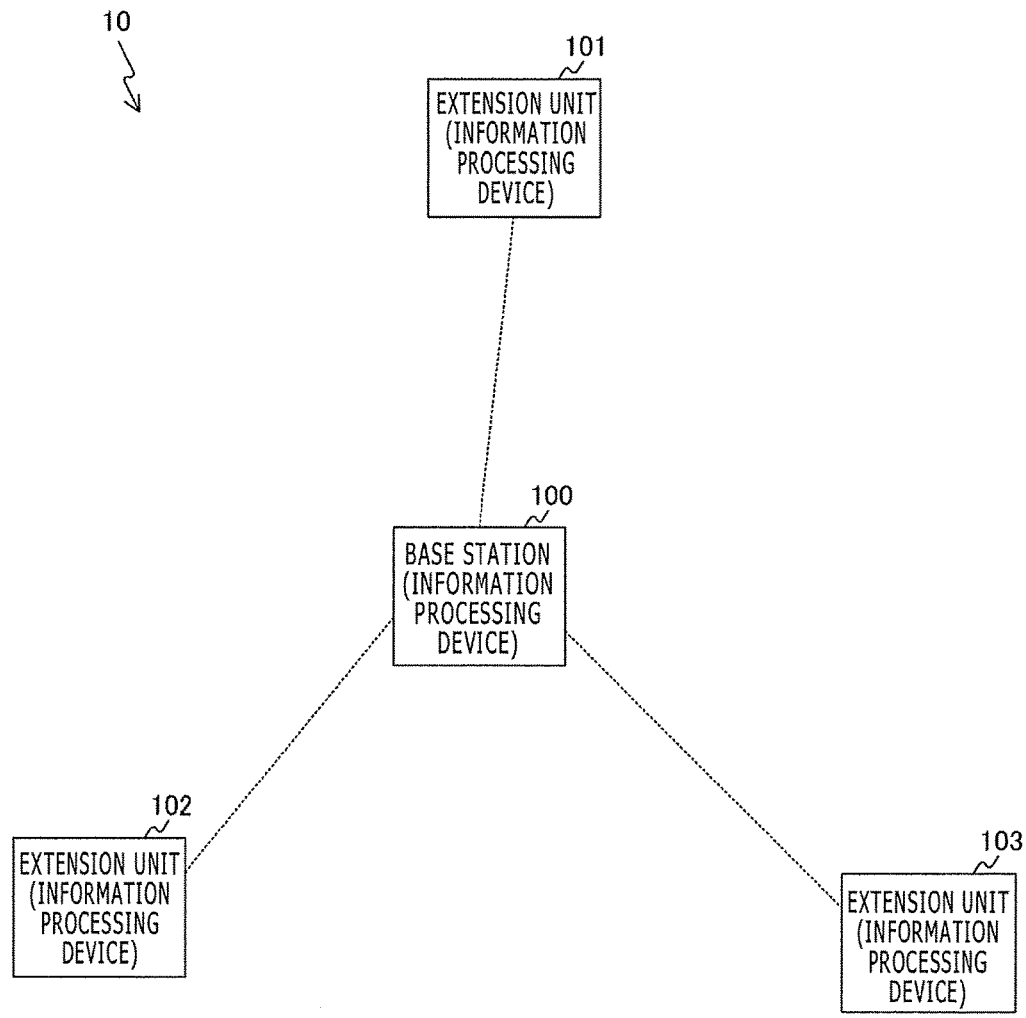
FIG. 1 is a schematic diagram depicting a configuration example of a wireless network formed by a communication system 10 as one embodiment of the present technology.

FIG. 1 is a schematic diagram depicting a configuration example of a wireless network formed by a communication system 10 as one embodiment of the present technology. The example in FIG. 1 depicts that a base station (information processing device) 100 and extension units (information processing devices) 101 to 103 make up the communication system 10 constituting a wireless network.

For example, the base station 100 and the extension units 101 to 103 may each be a stationary or a mobile information processing device having a wireless communication function. The stationary information processing device may be an access point or a base station of a wireless local area network (LAN) system, for example. The mobile information processing device may be a smartphone, a cellphone, or a tablet terminal, for example.

The base station 100 and the extension units 101 to 103 are each assumed to have the communication function supporting the wireless LAN standards under the Institute of Electrical and Electronic Engineers (IEEE) 802.11, such as the wireless LAN standards of the IEEE 802.11ax. For the wireless LAN, Wireless Fidelity (Wi-Fi), Wi-Fi Direct, or Wi-Fi CERTIFIED Miracast specifications (technical specification name: Wi-Fi Display) may be used. Alternatively, wireless communication may be performed using some other suitable communication method.

For example, the communication system 10 may constitute a network in which multiple devices communicate wirelessly with each other on a one-to-one basis when interconnected (e.g., making up a mesh network or ad-hoc network). The communication system 10 may be used in the mesh network under the IEEE 802.11s, for example.

As another example, the communication system 10 may constitute a network made up of an access point (base unit) and its subordinate devices (extension units). In this embodiment of the present technology, the base station 100 may act as the access point, and the extension units 101 to 103 may serve as subordinate devices to that access point (base station 100).

In FIG. 1, the devices that can communicate directly with each other wirelessly are depicted connected by dotted lines.

In the embodiment of the present technology, the operations of a source device (transmitting-side device) and those of a destination device (receiving-side device) will be described separately for purpose of explanation. It is to be noted that the functions of the two device types may be incorporated in a single device or that the function of either of the two device types may be incorporated in one device.

The system configuration addressed by the embodiment of the present technology is not limited to what is described above. For example, whereas FIG. 1 depicts a typical communication system made up of four information processing devices, the number of the configured information processing devices is not limited to four. The way the multiple information processing devices are connected with one another is not limited to any of the above-mentioned connection modes. For example, the embodiment of the present technology may be applied to a network that has multiple devices connected with each other in a manner different from any of the above-mentioned connection modes.

(Functional Configuration Example of Information Processing Device)

Figure 2:
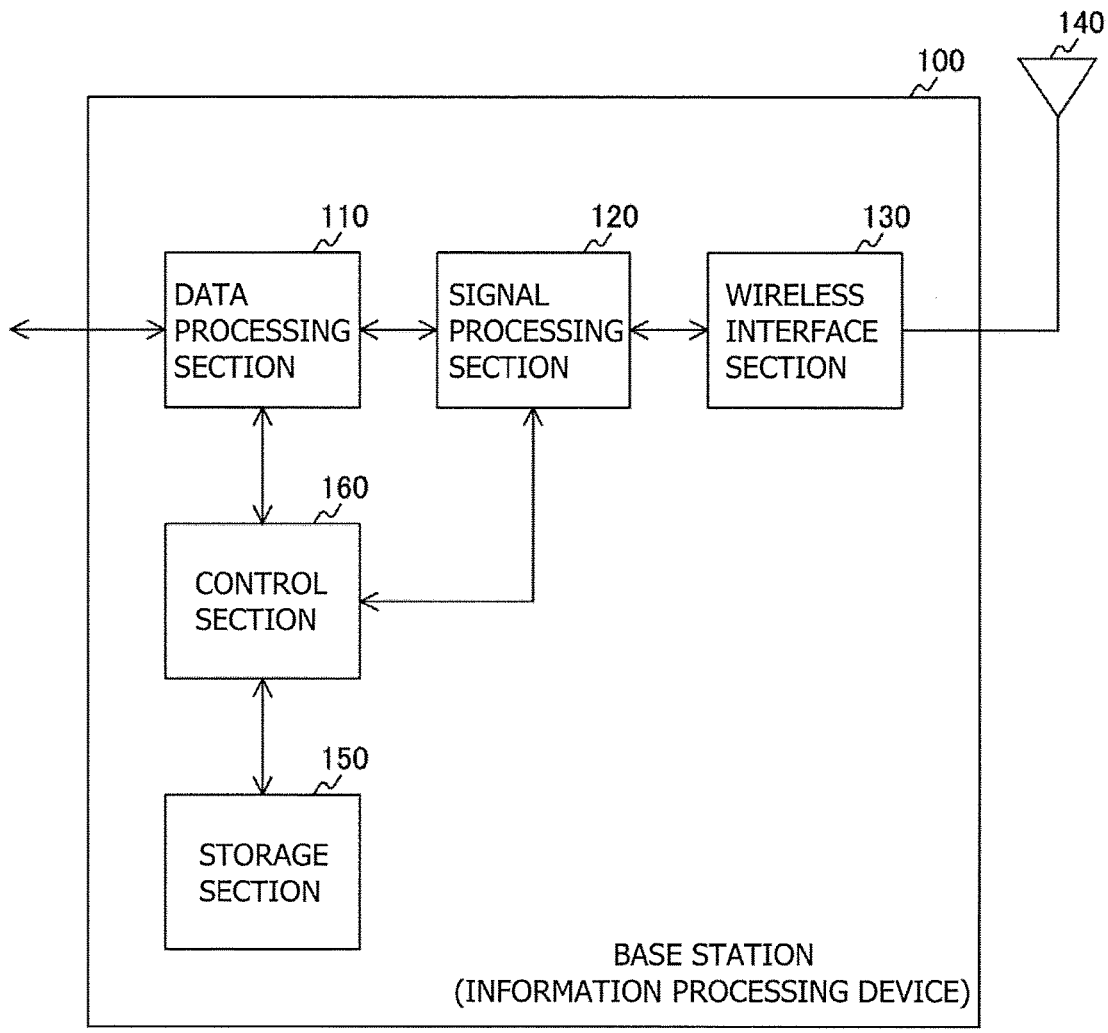
FIG. 2 is a block diagram depicting a functional configuration example of a base station 100 in the embodiment of the present technology.

FIG. 2 is a block diagram depicting a functional configuration example of the base station 100 in the embodiment of the present technology.

The base station 100 includes a data processing section 110, a signal processing section 120, a wireless interface section 130, an antenna 140, a storage section 150, and a control section 160.

The data processing section 110 processes diverse data under control of the control section 160. For example, the data processing section 110 generates a packet for wireless transmission by adding a media access control (MAC) header and an error-detecting code to data coming from an upper layer. The data processing section 110 supplies the generated packet to the signal processing section 120.

Upon receipt of data, the data processing section 110 may also perform such processes as header analysis and packet error detection on a string of bits received from the signal processing section 120, before supplying the processed data to an upper layer. The data processing section 110 may further notify the control section 160 of the results of the header analysis and packet error detection.

The signal processing section 120 performs diverse signal processing under control of the control section 160. For example, at the time of transmission, the signal processing section 120 encodes the data input from the data processing section 110 on the basis of a coding and modulation scheme set by the control section 160, adding a preamble and a physical layer (PHY) header to the data. The signal processing section 120 supplies the wireless interface section 130 with a transmitted symbol stream obtained from the signal processing.

At the time of reception, for example, the signal processing section 120 may detect the preamble and PHY header from a received symbol stream coming from the wireless interface section 130, before decoding the stream and supplying the data processing section 110 with the decoded result. Also, the signal processing section 120 notifies the control section 160 of the result of PHY header detection, for example.

The wireless interface section 130 is an interface that transmits and receives diverse information to and from another information processing device connected using wireless communication. For example, at the time of transmission, the wireless interface section 130 converts the input from the signal processing section 120 into an analog signal that is subjected to amplification, filtering, and up-conversion to a predetermined frequency. The wireless interface section 130 outputs the resulting signal to the antenna 140.

At the time of reception, for example, the wireless interface section 130 may reverse the processing on the input from the antenna 140 and feed the result of the processing to the signal processing section 120. Incidentally, the wireless interface section 130 is an example of the reception section stated in the appended claims.

The storage section 150 plays the role of a work area for data processing by the control section 160, and functions as a storage medium that holds diverse data. For example, a storage medium such as a nonvolatile memory, a magnetic disk, an optical disk, or a magneto-optical (MO) disk may be used as the storage section 150. An electrically erasable programmable read-only memory (EEPROM) or an erasable programmable ROM (EPROM), for example, may be used as the nonvolatile memory. A hard disk or a platter-like magnetic disk, for example, may be used as the magnetic disk. A Compact Disc (CD), a Digital Versatile Disc Recordable (DVD-R), or a Blu-Ray Disc (BD; registered trademark), for example, may be used as the optical disk.

The control section 160 controls the receiving and transmitting operations of the data processing section 110 and signal processing section 120. For example, the control section 160 transfers information between the sections, sets communication parameters, and schedules packets for the data processing section 110.

Suppose now that the extension unit to which to transmit data is a device capable of receiving the data destined therefor without transmitting to the base station 100 (i.e., device of the data transmission source) notification information (e.g., PS-Poll) indicating that the extension unit can receive the data upon transition from a function pause state to a data receivable state. In this case, if the control section 160 determines that the extension unit is in the data receivable state, the control section 160 performs control to transmit the data to the extension unit without receiving the notification information therefrom. For example, the control section 160 may perform control to transmit data to an extension unit at the time it is determined that the extension unit has transitioned from the function pause state to the data receivable state. As another example, the control section 160 may perform control to transmit data to an extension unit after verifying that the extension unit has transitioned from the function pause state to the data receivable state. As a further example, at the time it is determined that an extension unit has transitioned from the function pause state to the data receivable state, the control section 160 may notify the extension unit that data will be transmitted thereto.

In the ensuing paragraphs explaining the embodiments of the present technology, non-triggered transmission refers to the act of the base station notifying an extension unit of the existence of data using a beacon before transmitting the data to the extension unit without getting triggered by the extension unit.

The trigger in this context is PS-Poll, Quality-of-Service (QoS) Null (PM=0), or some other frame indicating the end of the function pause state, for example. PS-Poll is a signal indicating that a power saving state (e.g., function pause state) is exited and data is requested. QoS Null (PM=0) is a signal indicating that the power saving state (e.g., function pause state) is exited.

The function pause state means a state in which at least some of the functions usable by the extension unit are at pause. For example, the function pause state may be defined as a state in which the reception function usable by the extension unit is at pause (e.g., low-power consumption state such as doze state). However, it might happen that the extension unit is in the low-power consumption state in relation to the connected base station while performing other operations. It might also happen that the extension unit is in the low-power consumption state in relation to the connected base station while performing an operation regarding a group other than the group with which the extension unit is connected. Furthermore, it might happen that the extension unit is in the low-power consumption state in relation to the connected base station while searching through a group other than the group with which the extension unit is connected. Thus when the extension unit is in the low-power consumption state in relation to the connected base station but is not in the low-power consumption state relative to devices other than the connected base station, the extension unit is still considered to be in the function pause state.

(Configuration Example of Frame That Gives Notification of How Non-Triggered Transmission is Supported)

Figure 3:
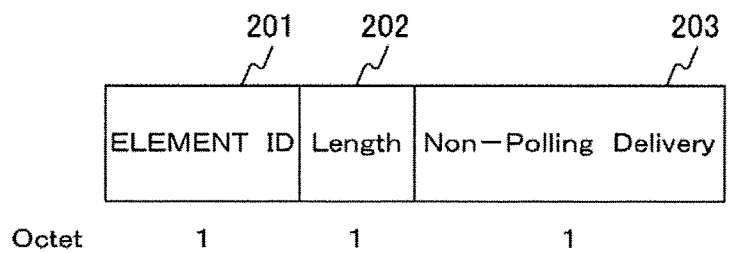
FIG. 3 is a schematic diagram depicting a configuration example of a frame used by extension units 101 to 103 in notifying the base station 100 of how they support non-triggered transmission in the embodiment of the present technology.

FIG. 3 is a schematic diagram depicting a configuration example of a frame used by extension units 101 to 103 in notifying the base station 100 of how they support non-triggered transmission in the embodiment of the present technology. FIG. 3 depicts an example in which an Information Element (IE) is used to give notification of support for non-triggered transmission.

The IE is made up of an ELEMENT ID field 201, a Length field 202, and a Non-Polling Delivery field 203. In FIG. 3, values indicative of octets of each field are indicated thereunder. Likewise in the subsequent drawings, values indicative of octets of each field (or a part thereof) are indicated thereunder.

The ELEMENT ID field 201 holds an identifier (ID) indicating that this is an IE giving notification of support for non-triggered transmission.

The Length field 202 holds information indicating the length of the data in the IE.

The Non-Polling Delivery field 203 holds information indicating support for non-triggered transmission (e.g., Non-Polling Delivery (NPD) Capability).

For example, the base station 100 verifies beforehand whether or not each of the extension units 101 to 103 supports non-triggered transmission. The base station 100 may cause each of the extension units 101 to 103 to transmit the IE depicted in FIG. 3, for example, thereby determining in advance whether or not each extension unit is supporting non-triggered transmission. [0058] The IE depicted in FIG. 3 may be transmitted and received at the time some information is exchanged between the base station 100 and each of the extension units 101 to 103. For example, the IE depicted in FIG. 3 may be transmitted and received at the time the capability information is exchanged using a handshake procedure.

As described above, the base station 100 may use the IE in FIG. 3 to verify beforehand whether or not each of the extension units 101 to 103 supports non-triggered transmission, and manage the results of the verification. For example, the base station 100 may store the results of the verification into the storage section 150 for management purposes. An example of such management is depicted in FIG. 4.

(Configuration Example of Traffic Indication Virtual Bitmap (TIVB))

Figure 4:
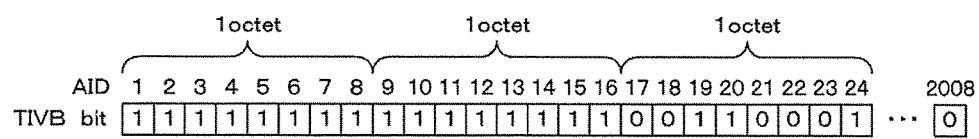
FIG. 4 is a schematic diagram depicting a configuration example of a traffic indication virtual bitmap (TIVB) managed by the base station 100 in the embodiment of the present technology.

FIG. 4 is a schematic diagram depicting a configuration example of a TIVB managed by the base station 100 in the embodiment of the present technology. FIG. 4 depicts an example in which there exist 24 extension units supporting non-triggered transmission, each extension unit being assigned an association identifier (AID). The AID is an identifier assigned by the base station 100 to each extension unit for management purposes.

The AIDs depicted in the upper part of FIG. 4 are those assigned to the extension units involved. TIVB bits depicted in the lower part of FIG. 4 are arranged in such a manner that each bit indicates whether or not data addressed to the corresponding AID is buffered. That is, if a TIVB bit is 1, that means data addressed to the corresponding AID is buffered; if a TIVB bit is 0, that means data addressed to the corresponding AID is not buffered.

As depicted in FIG. 4, the TIVB is used to manage whether or not data destined for each extension unit supporting non-triggered transmission is buffered.

For example, if data destined for an extension unit in the function pause state has arrived, the base station 100 buffers the data for the moment and sets to 1 the bit corresponding to the AID of the destination extension unit in the TIVB depicted in FIG. 4.

Also, the base station 100 determines, on a regular or irregular basis, whether or not data destined for each extension unit in the function pause state is buffered in the base station 100. If the base station 100 determines that data destined for an extension unit in the function pause state is buffered inside, the base station 100 notifies the destination extension unit to that effect using a beacon. For example, the base station 100 includes the notification to that effect into the traffic indication map (TIM) of a beacon before transmitting the beacon. The base station 100 may further notify the extension unit whether or not the buffered data will be transmitted in a non-triggered manner.

Suppose that data destined for multiple extension units in the function pause state are buffered in the base station 100. In this case, the base station 100 can transmit all data to the multiple extension units without getting triggered. At the time of such transmission, the base station 100 may use the IE depicted in FIG. 3 to notify each extension unit that the data will be transmitted thereto in a non-triggered manner. The base station 100 includes into the IE the information (e.g., global non-polling delivery announcement (G-NPDA)) indicating that all data will be transmitted in a non-triggered manner, before transmitting the IE.

Alternatively, the base station 100 may give notification of whether or not the data addressed to each AID will be transmitted in a non-triggered manner. For example, the base station 100 may notify an extension unit that there exists data destined for that extension unit using the TIM included in the beacon. Then the base station 100 can transmit the data to the extension unit at the time the latter enters the data receivable state. The TIM used for notification of the existence of data is also called a delivery traffic indication message (DTIM).

Figure 5:
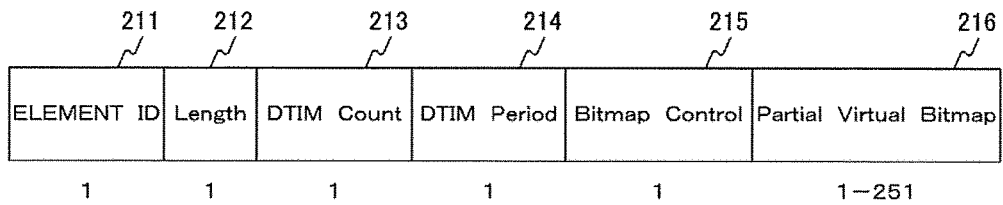
FIG. 5 is a schematic diagram depicting a typical frame format of a TIM transmitted from the base station 100 to extension units in the embodiment of the present technology.
Figure 6:
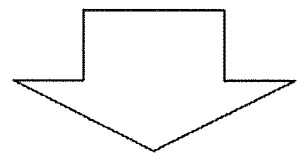
FIG. 6 is a schematic diagram depicting how a PVB transmitted from the base station 100 to extension units is typically generated in the embodiment of the present technology.

FIGS. 5 and 6 depict a partial virtual bitmap (PVB) frame format and a TIM frame format for use with the embodiment of the present technology.

(Example of TIM Frame Format)

FIG. 5 is a schematic diagram depicting a typical frame format of the TIM transmitted from the base station 100 to extension units in the embodiment of the present technology.

The TIM frame format is made up of an ELEMENT ID field 211, a Length field 212, a DTIM Count field 213, a DTIM Period field 214, a Bitmap Control field 215, and a Partial Virtual Bitmap field 216.

The ELEMENT ID field 211 holds an ID indicating that this is an IE giving notification of non-triggered transmission.

The Length field 212 holds information indicating the length of data in the TIM frame.

The DTIM Count field 213 holds information indicating the number of beacons until the next beacon.

The DTIM Period field 214 holds information indicating the value for setting the timing of transmitting the data buffered in the base station 100.

The Bitmap Control field 215 holds information regarding the next field.

The Partial Virtual Bitmap field 216 holds the PVB depicted in the lower part of FIG. 6.

(Example of PVB Generation)

FIG. 6 is a schematic diagram depicting how the PVB transmitted from the base station 100 to extension units is typically generated in the embodiment of the present technology. The TIVB depicted in the upper part of FIG. 6 is the same as that in FIG. 4. FIG. 6 depicts how the TIVB is typically related to the PVB.

When notifying each extension unit whether or not the data addressed to its AID will be transmitted individually in a non-triggered manner, the base station 100 can generate a bitmap based on the PVB under IEEE 802.11. In transmitting the TIM using a beacon, the base station 100 generates a PVB by extracting only the necessary elements from the TIVB, for example.

FIG. 6 depicts an example in which data addressed to AIDs=1 to 16, 19, 20, and 24 is buffered in the base station 100. That is, the example in FIG. 6 depicts that the PVB includes information about the data destined for the extension units identified by AIDs=1 to 24 and that each of the bits corresponding to AIDs=1 to 16, 19, 20, and 24 is set to 1. The example in FIG. 6 also depicts that each AID is notified of non-triggered transmission to be made to AIDs=1 to 4, 10 to 16, 19, 20, and 24. Explained hereunder is an example of the non-polling delivery bitmap (NPDB) individually notifying each AID of the setting of non-triggered transmission of the data addressed thereto on the basis of the PVB depicted in FIG. 6.

For example, each of AIDs=1 to 24 may be notified of whether or not non-triggered transmission is made thereto. In this case, as depicted in the lower part of FIG. 6, a bitmap is generated by setting "1" or "0" to the bit corresponding to each AID. That is, the value "1" is set to each of the bits corresponding to AIDs=1 to 4, 10 to 16, 19, 20, and 24 for which data is buffered in the base station 100 and to which non-triggered transmission is made. The value "0" is set to each of the bits corresponding to AIDs=5 to 9 for which data is buffered in the base station 100 but to which non-triggered transmission is not made. Also, the value "0" is set to each of the bits corresponding to AIDs=17, 18, and 21 to 23 for which data is not buffered in the base station 100.

The base station 100 and its extension units exchange AIDs therebetween beforehand. Thus without the transmission of an AID at the time of transmission of an NPDB, each extension unit can recognize the NPDB based on the content of the previously exchanged PVB.

Figure 7:
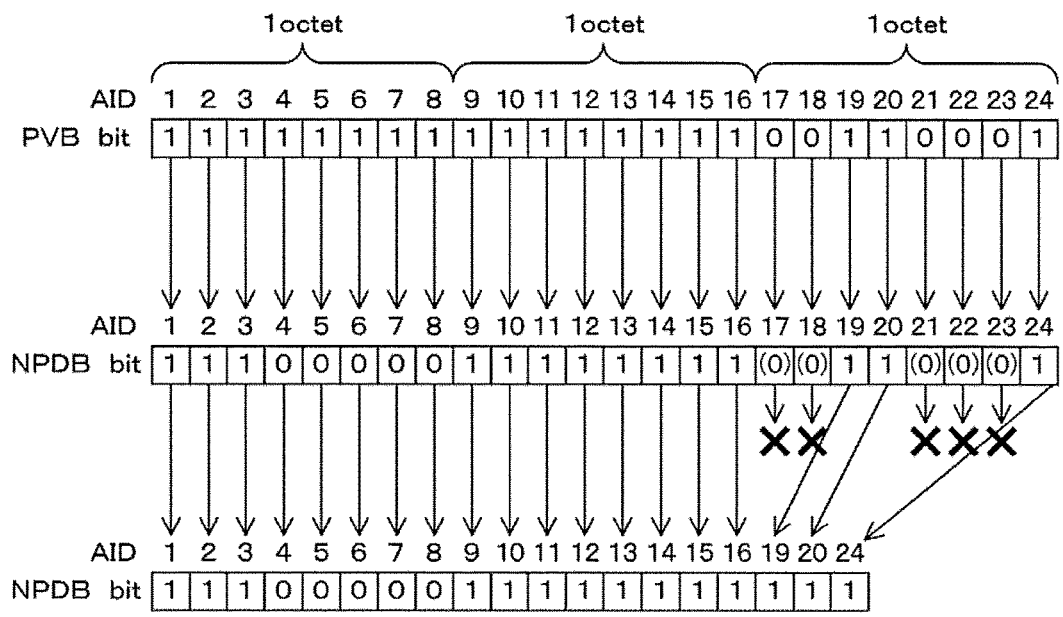
FIG. 7 is a schematic diagram depicting how a non-polling delivery bitmap (NPDB) is typically generated by the base station 100 in the embodiment of the present technology.

The above-described bitmap may be compressed by deleting unnecessary information therefrom. For example, the bitmap may be constituted without use of the bits corresponding to the AIDs for which data is not buffered in the base station 100, the bitmap being formed by the use of only the bits corresponding to the AIDs for which data is buffered in the base station 100. In this case, the bits corresponding to the unnecessary AIDs are deleted, so that the relations of correspondence between the actually assigned AIDs and the bit sequence are broken. However, these relations of correspondence may be reconstituted on the basis of the original content of the PVB. FIG. 7 depicts an example in which the bits corresponding to unnecessary AIDs are deleted in generating a non-polling delivery bitmap (NPDB) for making notification of non-triggered transmission.

(Example of Generating NPDB Based on PVB)

FIG. 7 is a schematic diagram depicting how the NPDB is typically generated by the base station 100 in the embodiment of the present technology. Specifically, FIG. 7 depicts an example in which, on the basis of the PVB, the base station 100 generates a bitmap (NPDB) for making notification of the non-triggered transmission setting. In FIG. 7, the value "0" represents the bit corresponding to each AID for which data is not buffered in the base station 100.

(Example of Notification of Transmission Method)

Explained below is an example of notification of the transmission method. As described above, the base station 100 can notify each extension unit, to which data is transmitted in a non-triggered manner, of information about the transmission method. For example, the base station 100 may give notification of the information required at the time of transmission in frequency division multiplex, with aggregation (Aggregate Media Access Control Protocol Data Unit (A-MPDU)), or in time division multiplex.

For example, if data is to be transmitted in frequency division multiplex (e.g., orthogonal frequency division multiple access (OFDMA)), notification is made of information about the frequency channel used for transmission. This allows the extension unit to receive the data transmitted in frequency division multiplex.

As another example, if data is to be transmitted with aggregation (A-MPDU), notification is made of the number of included packets destined for the corresponding extension unit. This allows the extension unit to stop receiving the data the moment all packets destined for the own device have been received. Stopping the reception further reduces power consumption. This also prevents the reception from getting canceled before all packets destined for the own device are received.

Along with or apart from the transmission method, notification can be made of the timing of data transmission (e.g., transmission time). In this case, the extension unit may remain in the function pause state until the time arrives for the data to be transmitted to the own device (e.g., until the transmission time). This further lowers power consumption.

The base station 100 may individually notify the extension unit identified by each AID of the above-mentioned transmission information (e.g., transmission method, transmission time) about the data addressed to each AID. When notified of such transmission information, the extension unit can wait for receiving data in accordance with the transmission information.

The bitmap used to make notification of the above-described transmission information may be generated on the basis of the PVB as in the case of the NPDB. Explained below are examples of generating a bitmap for making notification of the above transmission information.

As one example, all extension units with AIDs=1 to 24 may be notified of the transmission information. That is, valid data V is set to a string of the bits corresponding to AIDs=1 to 3, 9 to 16, 19, 20, and 24 for which data is buffered in the base station 100 and to which the data is transmitted in a non-triggered manner. Null data N is set to a string of the bits corresponding to AIDs=4 to 8 for which data is buffered in the base station 100 but to which the data is not transmitted in a non-triggered manner. Furthermore, null data N is set to a string of the bits corresponding to AIDs=17, 18, and 21 to 23 for which data is not buffered in the base station 100. The bitmap in which the valid data V and the null data N are set as described above may then be used.

The valid data in this context refers to the frequency channel for use if data is to be transmitted in frequency division multiplex, for example. The valid data also refers to the number of packets destined for the target extension unit and included in the aggregated frame if data is to be transmitted with aggregation, for example. The value data also refers to the transmission time. These data items are each composed of one octet, for example.

As described above, the bitmap may be compressed by deleting unnecessary information therefrom. Explained below with reference to FIG. 8 is an example of compressing the bitmap by deleting unnecessary information therefrom.

(Example of Generating Non-Polling Information Bitmap (NPIB) Based on PVB)

Figure 8:
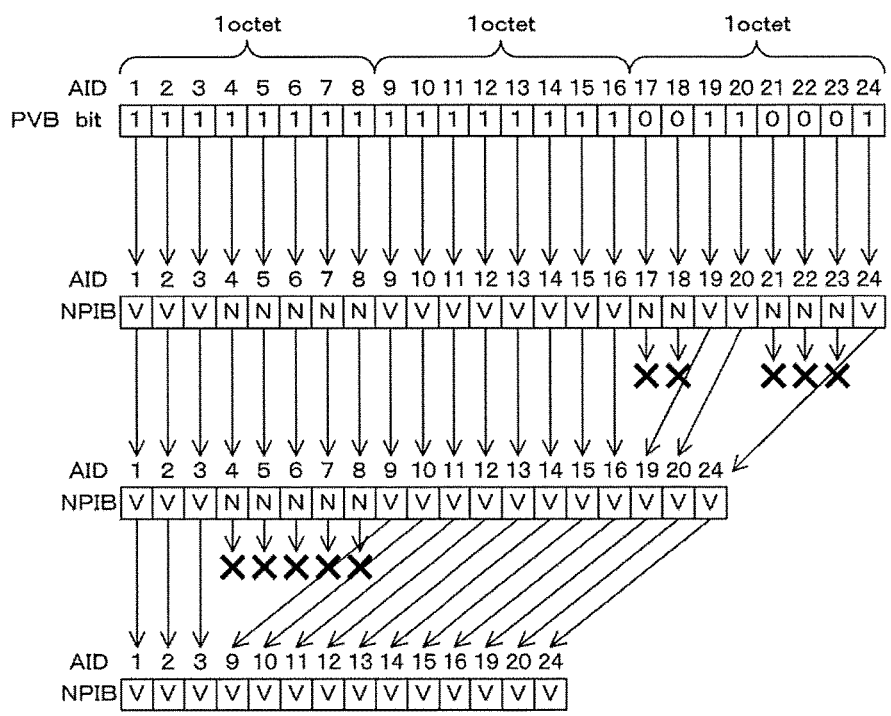
FIG. 8 is a schematic diagram depicting how a non-polling information bitmap (NPIB) is typically generated by the base station 100 in the embodiment of the present technology.

FIG. 8 is a schematic diagram depicting how the NPIB is typically generated by the base station 100 in the embodiment of the present technology. Specifically, FIG. 8 depicts an example in which base station 100 generates a bitmap (NPIB) for making notification of transmission information based on the PVB. In FIG. 8, the bit corresponding to each AID for which there exists valid data is indicated by reference character V, with null data indicated by N.

The example in FIG. 8 depicts that each of the bits corresponding to AIDs=1 to 16, 19, 20, and 24 is set to 1 where the PVB includes information about the data destined for the extension units identified by AIDs=1 to 24, as in the case of generating the NPDB. Also in this example, the extension units identified by AIDs=1 to 3, 9 to 16, 19, 20, and 24 are depicted to be notified that data is transmitted thereto in a non-triggered manner.

For example, a bitmap may be constituted using only the string of the bits corresponding to the AIDs for which data is buffered in the base station 100, without use of a string of the bits corresponding to the AIDs for which data is not buffered in the base station 100. In this case, the string of the bits corresponding to the unnecessary AIDs is deleted, so that the relations of correspondence between the actually assigned AIDs and the bit sequence are broken. However, these relations of correspondence may be reconstituted on the basis of the original content of the PVB. The second and the third tiers in FIG. 8 depict how the string of the bits corresponding to the unnecessary AIDs (AIDs=17, 18, 21 to 23) is typically deleted in generating a bitmap (NPIB) for making notification of the transmission information.

Alternatively, the null data destined for the extension units to which data is not transmitted in a non-triggered manner may be deleted for compression purposes. In this case, the bits corresponding to the unnecessary AIDs are deleted, so that the relations of correspondence between the actually assigned AIDs and the bit sequence are broken. However, these relations of correspondence may be reconstituted on the basis of the original content of the PVB and NPDB. The third and the fourth tiers in FIG. 8 depict how the string of the bits corresponding to the unnecessary AIDs (AIDs=4 to 8) is typically deleted in generating a bitmap (NPIB) for making notification of the transmission information.

As described above, where the NPIB is generated on the basis of the PVB, compression may be achieved in two steps.

As another example, each AID may not be notified of the transmission information. Instead, groups of the AIDs sharing the same transmission information may be collectively notified thereof. One such example is depicted in FIG. 9.

(Bitmap in which AIDs Sharing Same Transmission Information are Grouped)

Figure 9:
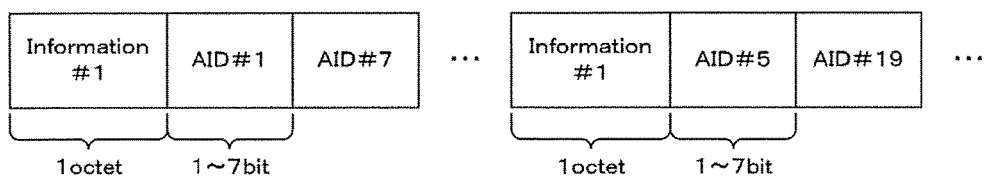
FIG. 9 is a schematic diagram depicting a typical bitmap transmitted from the base station 100 to extension units in the embodiment of the present technology.

FIG. 9 is a schematic diagram depicting a typical bitmap transmitted from the base station 100 to extension units in the embodiment of the present technology.

FIG. 9 depicts an example of a bitmap in which the AIDs sharing the same transmission information are grouped. That is, in the example of FIG. 9, AIDs=1 and 7 make up a group of AIDs sharing the same transmission information, and AIDs=5 and 19 constitute another group of AIDs sharing the same transmission information.

It is assumed here that there exist up to 2008 AIDs. That means 11 bits are needed to represent information about them. In such a case, the data size can become larger than that of the bitmap depicted in FIG. 8. Thus where the valid data is represented using one octet, the bitmap is preferably used only after the number of AIDs to which data is transmitted in a non-triggered manner is counted beforehand to determine whether or not their information can be represented using one octet or less.

Alternatively, the above-described bitmaps may each be extended within the TIM frame format depicted in FIG. 5. An example of such extension is depicted in FIG. 10. In another alternative, each of the above-described bitmaps may use a frame different from that of the beacon for making notification. For example, such a frame different from that of the beacon is a dedicated frame for making notification of each of the above-described bitmaps. The frame may be transmitted immediately after the beacon (e.g., after a short interframe space (SIFS)).

(Typical Frame Format of TIM)

FIG. 10 is a schematic diagram depicting a typical frame format of the TIM transmitted from the base station 100 to extension units in the embodiment of the present technology. The TIM depicted in FIG. 10 is an extended example of the TIM frame format indicated in FIG. 5. For this reason, the same parts as those in FIG. 5 are designated by the same reference numerals, and their explanations are omitted hereunder where redundant.

The frame format of the TIM in FIG. 10 is a typical frame format in which the above-mentioned non-polling delivery bitmap (NPDB) and non-polling information bitmap (NPIB) are included.

A Non-Polling Delivery Bitmap (NPDB) field 217 and a Non-Polling Information Bitmap (NPIB) field 218 are included in the frame format of the TIM. The Non-Polling Delivery Bitmap (NPDB) field 217 holds the NPDB depicted in the lower tier of FIG. 7. The Non-Polling Information Bitmap (NPIB) field 218 holds the NPIB depicted in the lowest tier of FIG. 8. These fields constitute information that can be compressed and reconstituted on the basis of the Partial Virtual Bitmap field 216.

(Communication Examples)

Examples of the communication of data transmitted and received between multiple devices are explained below with reference to FIGS. 11 to 14.

FIGS. 11 to 14 depict examples in which the base station 100 is a data transmission source and the extension units 101 to 103 are data transmission destinations. In FIGS. 11 to 14, the horizontal axis represents the time axis. Where a given extension unit is in the doze state, the portion of the time axis corresponding to that extension unit is indicated by a rectangle depicted shaded under the time axis. Where a given extension unit is not in the doze state, that extension unit is assumed to be in the awake state. In the drawings, TBTT stands for a target beacon transmission time, i.e., information about the timing for beacon transmission.

(Example of Data Transmission)

FIG. 11 is a schematic diagram depicting the flow of data transmitted and received between devices in the embodiment of the present technology.

Subfigure "a" in FIG. 11 depicts an example of performing non-triggered transmission. Subfigure "b" in FIG. 11 depicts a comparative example of performing normal data transmission.

As depicted in Subfigure "b" of FIG. 11, where there is no need for the extension units 101 to 103 to communicate, they transition from the normally active awake state to the doze state in which no signal is transmitted or received. This lowers power consumption.

The extension units 101 to 103 in the doze state enter the awake state at regular intervals and, using a signal from the base station 100, verify whether or not any data destined for the own devices is buffered in the base station 100. For example, the verification is made using the TIM of a beacon 411. The example in Subfigure "b" of FIG. 11 depicts that data destined for the extension units 101 and 102 is buffered in the base station 100.

As described above, where data destined for the own devices is buffered, the extension units 101 and 102 transmit data request frames (PS-Poll) 412 and 416 to the base station 100. For example, after transmitting the data request frame 412 to the base station 100, the extension unit 101 receives an acknowledgement (ACK) frame 413 therefrom in response to the transmitted request frame 412 and then receives data 414. After transmitting an ACK frame 415 with regard to the data 414, the extension unit 101 returns to the doze state.

Incidentally, the PS-Poll frame constitutes information indicating that this extension unit is in the awake state and that this frame is a data transmission request.

After transmitting a data request frame 416 to the base station 100, the extension unit 102 receives an ACK frame 417 therefrom in response to the transmitted request frame 416 and then receives data 418, for example. After transmitting an ACK frame 419 with regard to the data 418, the extension unit 102 returns to the doze state.

If there are multiple extension units requesting data as depicted in Subfigure "b" of FIG. 11, there is a possibility that multiple extension units may transmit multiple PS-Poll frames concurrently. In view of this, a collision avoidance algorithm may be used to stagger the times at which the multiple PS-Poll frames are transmitted. However, a time loss is caused by the collision avoidance algorithm staggering the times for transmitting multiple PS-Poll frames.

If the base station 100 receives the data request frame 412 from the extension unit 101, the base station 100 transmits the data 414 in response to the received data request frame 412. In this case, the extension unit 102 cannot perform transmission while the data 414 is being transmitted. Thus it may take longer for the extension unit 102 to return to the doze state, which can increase power consumption.

According to the embodiment of the present technology, by contrast, the base station notifies the extension unit of the existence of data destined therefor using a beacon, before transmitting the data to the extension unit without getting triggered by the extension unit. When making notification of the existence of data using a beacon, the base station may also give notification of non-triggered transmission of the data, the method of transmitting the data, and transmission information about the timing of the transmission.

While the non-triggered transmission is underway, the extension units do not transmit data request frames (e.g., PS-Poll frames). The non-triggered transmission is performed at predetermined intervals without use of the collision avoidance algorithm (called Backoff). For example, the non-triggered transmission may be performed at intervals of the shortest definable time unit (e.g., short interframe space (SIFS)). It is assumed, as discussed above, that the base station verifies beforehand whether or not each extension unit supports non-triggered transmission.

Specifically, as depicted in Subfigure "a" of FIG. 11, the base station 100 transmits a beacon 401 including the TIM (such as one depicted in FIG. 5 or 10) to each extension unit. The example in Subfigure "a" of FIG. 11 depicts that data destined for the extension units 101 and 102 is buffered in the base station 100.

Upon elapse of a predetermined time period (e.g., SIFS) following transmission of the beacon 401, the base station 100 transmits data 402 destined for the extension unit 101 to that extension unit 101. The extension unit 101 transmits an ACK frame 403 with regard to the data 402 to the base station 100. The extension unit 101 then returns to the doze state.

Figure 14:
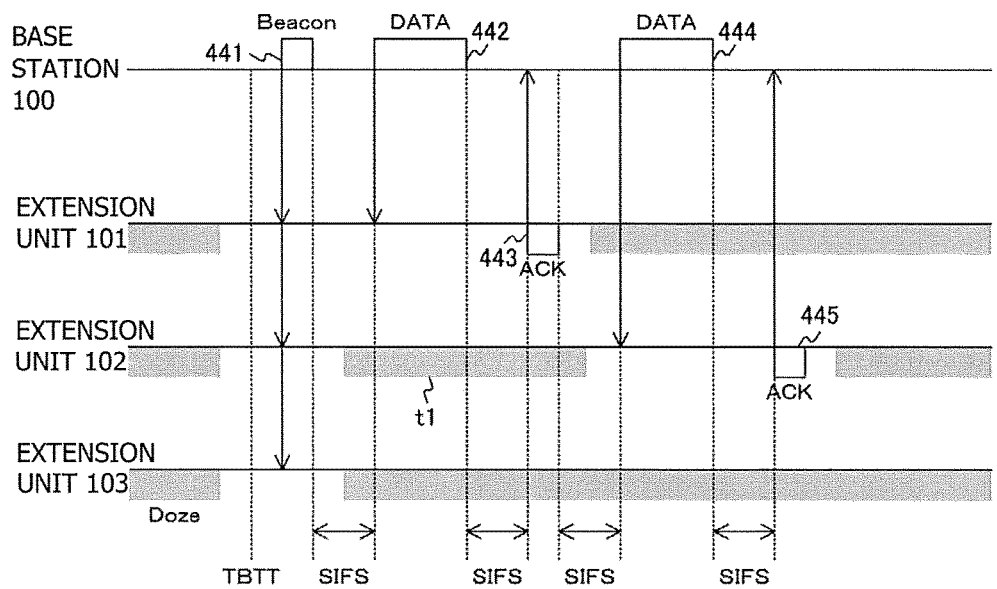
FIG. 14 is another schematic diagram depicting the flow of data transmitted and received between devices in the embodiment of the present technology.

Alternatively, while the base station 100 and the extension unit 101 are communicating with each other, the extension unit 102 may transition to the doze state. A time slot for the transition to the doze state may be set on the basis of the transmission information (e.g., transmission timing) included in the beacon 401. An example of how this is done is depicted in FIG. 14.

Upon elapse of a predetermined time period (e.g., SIFS) following reception of the ACK frame 403, the base station 100 transmits data 404 destined for the extension unit 102 to that extension unit 102. The extension unit 102 transmits an ACK frame 405 with regard to the data 404 to the base station 100. The extension unit 102 then returns to the doze state.

Some other suitable method may be used for transmitting data. For example, any one of such methods as frequency division multiplex, aggregation (A-MPDU), and time division multiplex may be adopted. Examples of using these methods are depicted in FIGS. 12 to 14.

(Example of Data Transmission in Frequency Division Multiplex)

Figure 12:
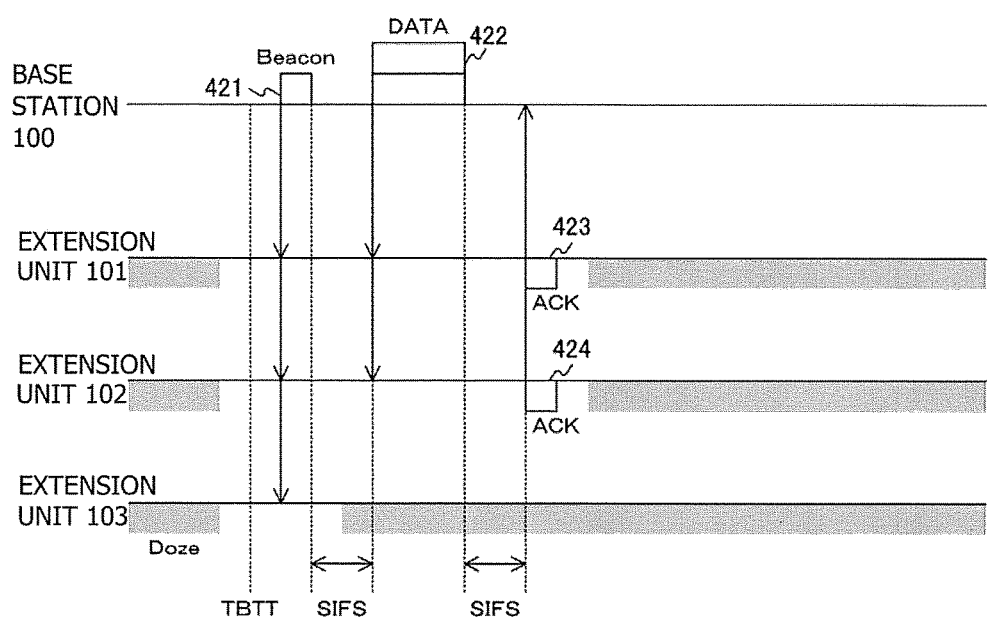
FIG. 12 is another schematic diagram depicting the flow of data transmitted and received between devices in the embodiment of the present technology.
Figure 13:
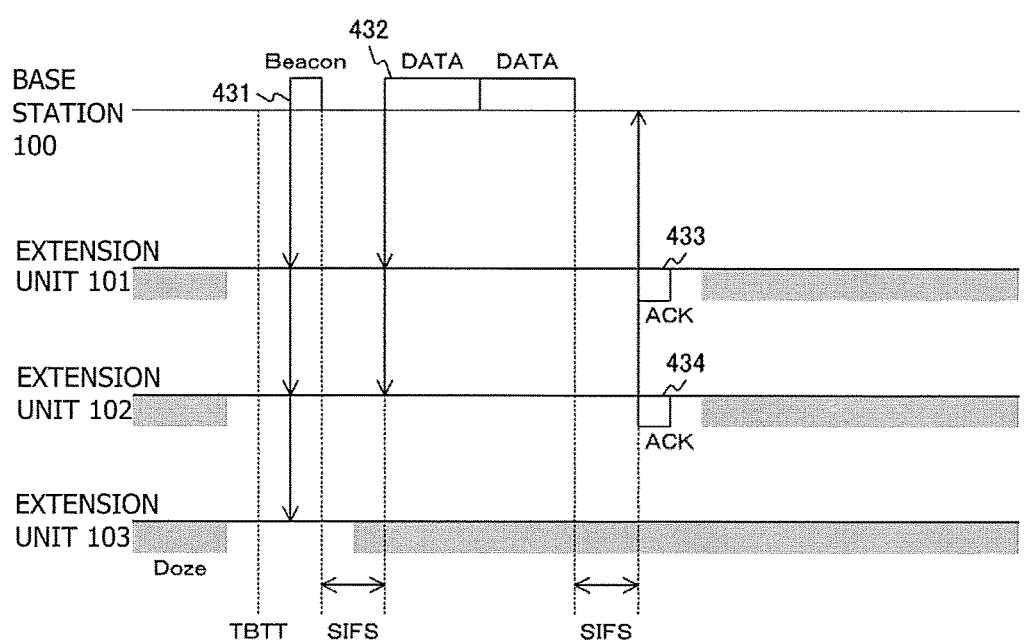
FIG. 13 is another schematic diagram depicting the flow of data transmitted and received between devices in the embodiment of the present technology.

FIG. 12 is another schematic diagram depicting the flow of data transmitted and received between devices in the embodiment of the present technology. FIG. 12 depicts an example of using the method of data transmission in frequency division multiplex. One typical method of frequency division multiplex that may be used is orthogonal frequency division multiple access (OFDMA).

In FIG. 12, it is assumed that data 422 represented by two rectangles overlaid with one another in a direction orthogonal to the time axis is made up of two frequency-multiplexed data items, one being destined for the extension unit 101 and another for the extension unit 102.

(Example of Data Transmission with Aggregation)

FIG. 13 is another schematic diagram depicting the flow of data transmitted and received between devices in the embodiment of the present technology. FIG. 13 depicts an example of using the method of data transmission with aggregation.

In FIG. 13, it is assumed that data 432 represented by two rectangles arranged side by side in the direction of the time axis is made up of two aggregated data items, one being destined for the extension unit 101 and another for the extension unit 102, the aggregated data items constituting an aggregate media access control (MAC) protocol data unit (A-MPDU). It is also assumed that each of the aggregated data items has a different destination described therein.

(Example of Data Transmission in Time Division Multiplex)

FIG. 14 is another schematic diagram depicting the flow of data transmitted and received between devices in the embodiment of the present technology. FIG. 14 depicts an example of using the method of data transmission in time division multiplex (scheduling).

As described above, the extension unit 102 may transition to the doze state while the base station 100 and the extension unit 101 are communicating with each other (for duration time t1). The time slot (duration time t1) for making transition to the doze state may be set on the basis of the transmission information (e.g., transmission timing) included in a beacon 441. For example, the extension unit 102 may transition to the doze state immediately after receiving the beacon 441, and may transition to the awake state immediately before data 444 destined for the extension unit 102 is transmitted thereto.

The above-described transmission methods are not limitative of how an extension unit transmits a confirmation of reception (e.g., ACK, Block ACK (BA)) to the base station. Some other suitable transmission method may be used instead. For example, the base station may receive confirmations of reception successively from one or multiple extension units. Alternatively, the base station may receive frequency-multiplexed confirmations of reception from one or multiple extension units. In another alternative, the base station may receive a confirmation of reception from one extension unit representing multiple extension units. In yet another alternative, the base station may transmit a request for a confirmation of reception to an extension unit, and receive the confirmation of reception from the extension unit to which the request for the confirmation of reception was transmitted.

If the extension unit fails to receive data, the base station may withhold retransmission of the data in the above-described sequence. At the end of the above sequence, the base station may retransmit the data in the normal transmission sequence.

If the transmitted data contains information indicating that no further data is buffered in the base station (e.g., "0" set in a More DATA field), the destination extension unit may withhold transmission of a PS-Poll frame in subsequent sequences.

(Operation Example of Extension Unit)

Figure 15:
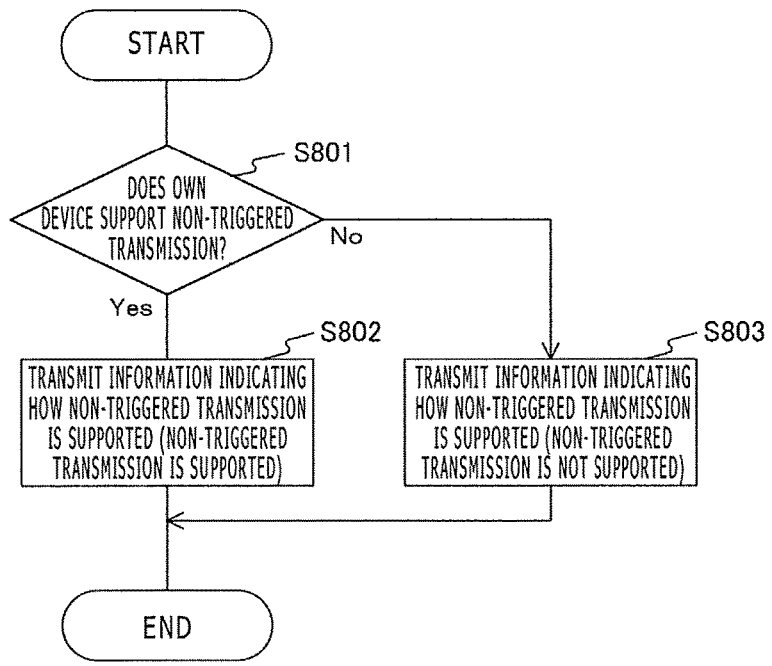
FIG. 15 is a flowchart depicting a typical procedure of notification processing performed by the extension unit 101 in the embodiment of the present technology.

FIG. 15 is a flowchart depicting a typical procedure of notification processing performed by the extension unit 101 in the embodiment of the present technology. The notification processing is performed at a predetermined timing (e.g., at the time the extension unit is connected anew with the base station).

First, the control section (equivalent to the control section 160 depicted in FIG. 2) of the extension unit 101 determines whether or not the own device (extension unit 101) supports non-triggered transmission (step S801). If it is determined that the own device supports non-triggered transmission (step S801), the control section of the extension unit 101 performs control to transmit information indicating how non-triggered transmission is supported (i.e., information indicating that non-triggered transmission is supported) to the base station 100 (step S802).

If the own device does not support non-triggered transmission (step S801), the control section of the extension unit 101 performs control to transmit information indicating how non-triggered transmission is supported (i.e., information indicating that non-triggered transmission is not supported) to the base station 100 (step S803). Incidentally, steps S801 and S802 constitute an example of the notification procedure stated in the appended claims.

(Operation Example of Base Station (Information Processing Device))

Figure 16:
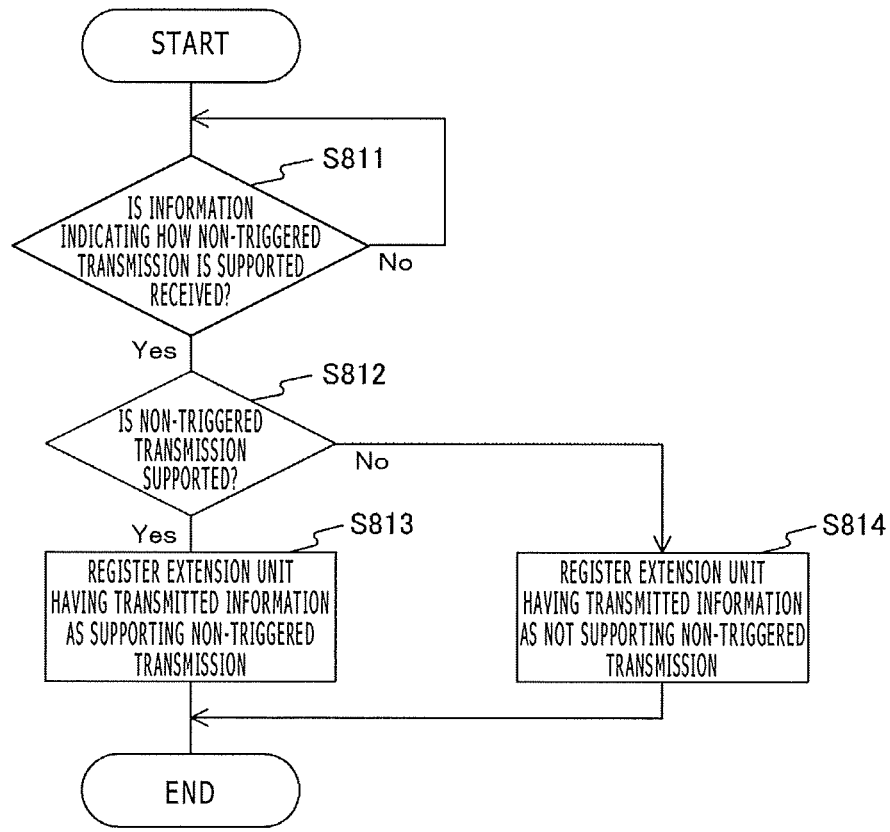
FIG. 16 is a flowchart depicting a typical procedure of registration processing performed by the base station 100 in the embodiment of the present technology.

FIG. 16 is a flowchart depicting a typical procedure of registration processing performed by the base station 100 in the embodiment of the present technology.

First, the control section 160 of the base station 100 determines whether or not the information indicating how non-triggered transmission is supported is received (step S811). If it is determined that the information indicating how non-triggered transmission is supported is not received (step S811), the control section 160 continuously monitors incoming information.

If the information indicating how non-triggered transmission is supported is received (step S811), the control section 160 determines whether or not the received information indicates that non-triggered transmission is supported (step S812).

If it is determined that the received information indicates that non-triggered transmission is supported (step S812), the control section 160 registers the extension unit that transmitted the information as supporting non-triggered transmission (step S813).

If the received information indicates that non-triggered transmission is not supported (step S812), the control section 160 registers the extension unit that transmitted the information as not supporting non-triggered transmission (step S814). In this manner, the control section 160 can manage whether or not each extension unit supports non-triggered transmission.

(Operation Example of Base Station (Information Processing Device))

Figure 17:
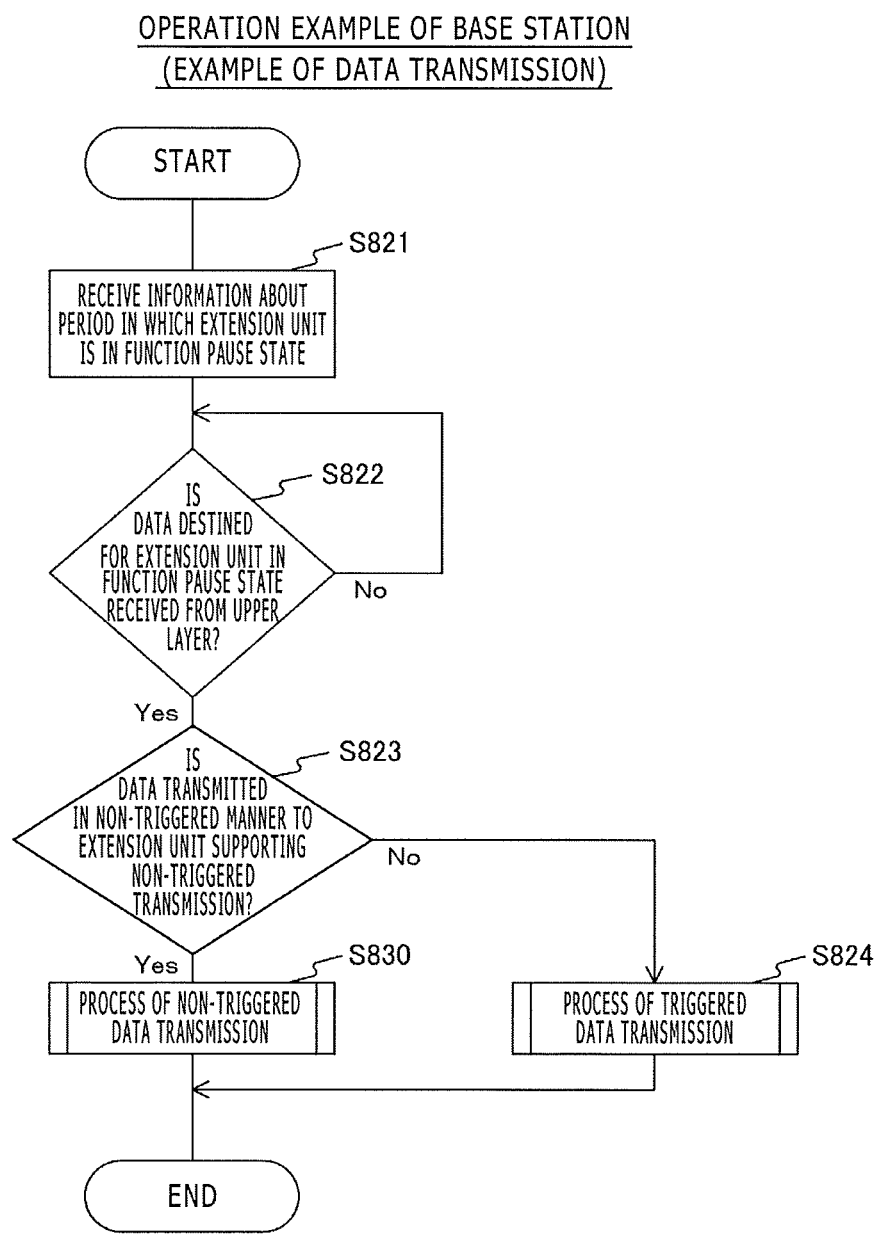
FIG. 17 is a flowchart depicting a typical procedure of data transmission processing performed by the base station 100 in the embodiment of the present technology.

FIG. 17 is a flowchart depicting a typical procedure of data transmission processing performed by the base station 100 in the embodiment of the present technology.

First, the control section 160 of the base station 100 receives information about the period in which the extension unit is in the function pause state (step S821).

At this point, the control section 160 of the base station 100 can estimate that the extension unit is in the awake state. This allows the control section 160 of the base station 100 to estimate the period in which the extension unit is in the function pause state. The information for estimating that the extension unit is in the awake state is explained below.

The timing for the extension unit to transition from the function pause state to the awake state may be estimated using a Listen Interval field. The extension unit may communicate the Listen Interval field to the base station beforehand, when the base station and the extension unit are in association with one another, for example.

The Listen Interval field indicates the cycle in which a beacon is received. The Listen Interval field is given at beacon intervals. The base station may communicate the beacon interval to the extension unit beforehand, when the base station and the extension unit are in association with one another, for example. The beacon interval is given in TUs, where one TU is 1024 μs. In this manner, on the basis of the previously communicated information from the extension unit about the cycle in which the function pause state is exited, the control section 160 can determine that the extension unit has transitioned from the function pause state to the data receivable state.

The control section 160 then determines whether or not the data processing section 110 has received from an upper layer the data destined for the extension unit in the function pause state (step S822). If it is determined that the data processing section 110 has not received from an upper layer the data destined for the extension unit in the function pause state (step S822), the control section 160 continuously monitors data reception.

If the data processing section 110 has received from an upper layer the data destined for the extension unit in the function pause state (step S822), the control section 160 manages retention of the data destined for the extension unit. For example, as depicted in FIG. 4, the control section 160 sets 1 to an AID bit (TIVB bit) corresponding to the extension unit. If the data destined for the extension unit is deleted, the control section 160 sets 0 to the AID bit (TIVB bit) corresponding to the extension unit. The control section 160 then determines whether or not to perform non-triggered data transmission to the extension unit supporting non-triggered transmission (step S823). For example, it might happen that non-triggered transmission will not be made to an extension unit even if that extension unit supports non-triggered transmission. The data required to be transmitted reliably is transmitted normally and not in a non-triggered manner, for example. The data required to be transmitted reliably includes emergency data or emergency calls (such as data for reporting a danger to life), for example. The emergency calls typically constitute information about the life of a person or an animal (e.g., information reporting a heart attack or information indicating that a person has collapsed). For ordinary content (e.g., image or audio content), it is determined that the data need only be transmitted normally in a non-triggered manner.

If the data is to be transmitted in a non-triggered manner to the extension unit supporting non-triggered transmission (step S823), the process of non-triggered data transmission is performed (step S830). This data transmission process is discussed below in detail with reference to FIG. 18.

The process of non-triggered data transmission (step S830) is carried out at the time it is determined that the extension unit supporting non-triggered transmission has exited the function pause state.

If the data is not to be transmitted in a non-triggered manner to the extension unit supporting non-triggered transmission (step S823), the process of triggered data transmission is performed (step S824). This data transmission process is the same as the normal data transmission process and thus will not be discussed further.

(Operation Example of Non-Triggered Data Transmission Process)

Figure 18:
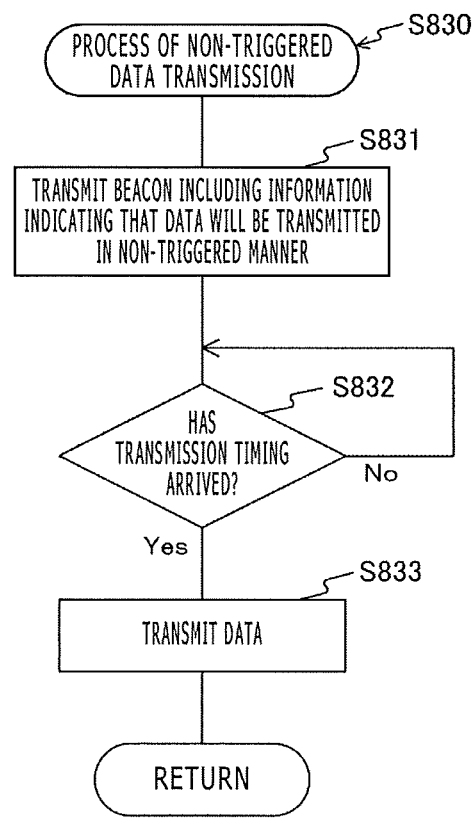
FIG. 18 is a flowchart depicting an example of a non-triggered data transmission process as part of the data transmission processing performed by the base station 100 in the embodiment of the present technology.

FIG. 18 is a flowchart depicting an example of the non-triggered data transmission process (procedure of step S830 in FIG. 17) as part of the data transmission processing performed by the base station 100 in the embodiment of the present technology.

First, the control section 160 of the base station 100 performs control to transmit a beacon including information indicating that the data will be transmitted in a non-triggered manner (step S831). For example, a beacon is transmitted with the PVB of FIG. 6, the NPDB of FIG. 7, or the NPIB of FIG. 8 included therein.

The control section 160 then determines whether or not the transmission timing has arrived (step S832). If it is determined that the transmission timing has not arrived yet (step S832), the control section 160 continuously monitors the timing. If the transmission timing has arrived (step S832), the control section 160 transmits to the extension unit the data for which the transmission timing has arrived (step S833).

If there exists data to be transmitted to and destined for multiple extension units, it is determined whether or not the transmission timing has arrived for each extension unit. The data is then transmitted successively to each of the extension units for which the transmission timing has arrived. Incidentally, steps S821 to S823 and S831 to S833 constitute an example of the control procedure stated in the appended claims.

As described above, the control section 160 performs control to notify the extension unit of at least either the transmission method or the transmission timing for data transmission, in addition to the information indicating that data will be transmitted to the extension unit in a non-triggered manner at the time the extension unit is determined to have transitioned from the function pause state to the data receivable state. In this case, the control section 160 may give notification of the transmission method in terms of either the frequency channel to be used for data transmission in frequency division multiplex or the number of packets destined for the extension unit from among the aggregated packets to be transmitted.

(Operation Example of Extension Unit)

Figure 19:
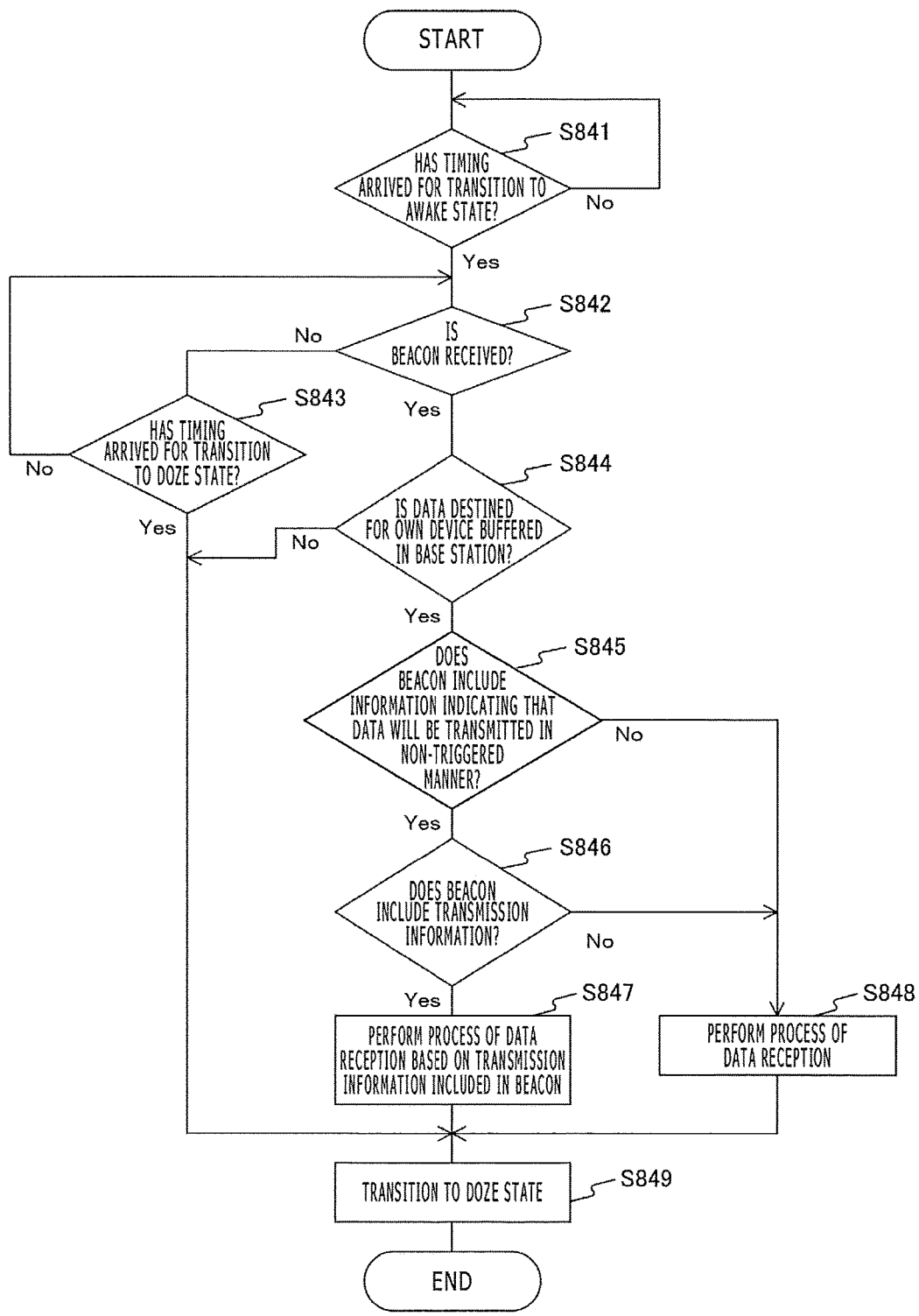
FIG. 19 is a flowchart depicting a typical procedure of data reception processing performed by the extension unit 101 in the embodiment of the present technology.

FIG. 19 is a flowchart depicting a typical procedure of data reception processing performed by the extension unit 101 in the embodiment of the present technology.

First, the control section of the extension unit 101 determines whether or not the timing has arrived for making a transition to the awake state (step S841). If it is determined that the timing has not arrived yet for transition to the awake state (step S841), the control section continuously monitors the timing.

If the timing has arrived for making a transition to the awake state (step S841), the awake state is entered. The control section of the extension unit 101 determines whether or not a beacon is received (step S842). If it is determined that a beacon is not received (step S842), the control section of the extension unit 101 determines whether or not the timing has arrived for making a transition to the doze state (step S843). If the timing has arrived for transition to the doze state (step S843), the doze state is entered (step S849). If the timing has not arrived yet for masking a transition to the doze state (step S843), the control section returns to step S842.

If it is determined that a beacon is received (step S842), the control section of the extension unit 101 determines whether or not data destined for the own device is buffered in the base station 100 on the basis of information (e.g., PVB in FIG. 6) included in the received beacon (step S844). If it is determined that the data destined for the own device is not buffered in the base station 100 (step S844), the control section goes to step S849. Alternatively, if the data destined for the own device is not buffered in the base station 100 (step S844), the control section may go to step S849 after the timing has arrived for making a transition to the doze state.

If the data destined for the own device is buffered in the base station 100 (step S844), the control section of the extension unit 101 determines whether or not the received beacon includes information indicating that the data will be transmitted in a non-triggered manner (step S845). If it is determined that the beacon does not include information indicating that the data will be transmitted in a non-triggered manner (step S845), the control section of the extension unit 101 performs control to carry out the process of triggered data reception (step S848).

If the beacon includes the information indicating that the data will be transmitted in a non-triggered manner (step S845), the control section of the extension unit 101 determines whether or not the received beacon includes the transmission information (e.g., transmission method, transmission timing) (step S846). If it is determined that the beacon does not include the transmission information (step S846), the control section goes to step S848.

If the beacon includes the transmission information (step S846), the control section of the extension unit 101 performs control to carry out the process of data reception based on the transmission information (step S847). Incidentally, steps S841 to S848 constitute an example of the control procedure stated in the appended claims.

For example, if the transmission method is included in the transmission information, the process of data reception is performed in accordance with that transmission method. If the transmission method designates the use of frequency division multiplex and the frequency channel to be used for the transmission, the data transmitted in frequency division multiplex is received on the designated frequency channel.

As another example, suppose that the transmission method designates the transmission of aggregated data (aggregated packets) and the number of packets destined for the own device from among the aggregated packets. In this case, the data destined for the own device is received until the designated number of packets is reached. Arrangements may be made so that once the designated number of packets is reached, the control section transitions to the function pause state.

As a further example, if the transmission information includes the transmission timing, the process of data reception is performed in accordance with that transmission timing. If a specific transmission time is designated as the transmission timing, the data destined for the own device is received when the designated transmission time is reached. Arrangements may be made so that the control section waits for data reception until the designated transmission time is reached, the control section remaining in the function pause state while waiting for the reception.

As yet another example, if the transmission information includes both the transmission method and the transmission timing, the process of data reception is performed in accordance with the transmission method and the transmission timing. In this case, the data reception process is accomplished using a combination of the above-described processes of data reception.

As described above, the control section of the extension unit 101 can notify the base station that the extension unit is able to receive data, without transmitting to the base station the information indicating that data can be received when the own device transitions from the function pause state to the data receivable state. Also, the control section of the extension unit 101 may perform control to receive the data from the base station at the time the own device transitions from the function pause state to the data receivable state.

Also, at the time the extension unit 101 transitions from the function pause state to the data receivable state, the control section of the extension unit 101 may perform control to receive the data from the base station after receiving information indicating that the data will be transmitted from the base station.

Also, if at least either the transmission method or the transmission timing is designated, the control section of the extension unit 101 may perform control to wait for receiving data from the base station in accordance with at least either the designated transmission method or the designated transmission timing.

As described above, the wireless LAN standards stipulate the power saving function for reducing the power consumption of extension units. For example, an extension unit in the doze state enters the awake state at regular intervals to determine, using a signal from the base station, whether or not data destined for the own device exists in the base station. If it is determined that the data destined for the own device exists in the base station, the extension unit communicates the awake state and a trigger (e.g., PS-Poll) representing a data transmission request to the base station. After receiving the data from the base station, the extension unit transitions to the doze state. However, if multiple extension units are configured, there is a possibility that multiple triggers may be transmitted concurrently, activating a collision avoidance algorithm leading to a time loss. The time loss thus incurred causes each extension unit to take longer to return to the doze state, which increases power consumption.

According to the embodiment of the present technology, the base station notifies the extension unit of non-triggered data transmission the moment the base station recognizes the existence of the data destined for that extension unit. Immediately after the notification, the base station transmits the data to the extension unit. This helps reduce the time loss. It is also possible to suitably transmit the information necessary for the non-triggered data transmission.

As described above, the embodiment of the present technology enables transmission of data to an extension unit in the function pause state without the intervention of the trigger such as the PS-Poll frame. This eliminates the redundancy stemming from the use of the PS-Poll frame or similar means and thereby prolongs the time period during which the extension unit can remain in the doze state. This reduces power consumption. Furthermore, the embodiment permits efficient notification of the information necessary for non-triggered data transmission. That is, the embodiment minimizes the time loss typically caused by the use of the PS-Poll frame in order to prolong the time period of the doze state, thereby reducing power consumption.

The base station 100 and the extension units 101 to 103 in the embodiment of the present technology may be used in conjunction with devices in diverse fields. For example, the base station 100 and the extension units 101 to 103 may be used as wireless devices employed on board an automobile (e.g., car navigation system, smartphone). As another example, the base station 100 and the extension units 101 to 103 may be used as learning devices (e.g., tablet terminals) employed in the field of education. As a further example, the base station 100 and the extension units 101 to 103 may be used as wireless devices employed in the field of agriculture (e.g., terminals of a cattle management system). Likewise, the base station 100 and the extension units 101 to 103 may be used as wireless devices employed in such fields as sports and medical care.

2. Applications

The technology of the present disclosure may be applied to diverse products. For example, the base station 100 and the extension units 101 to 103 may be realized in the form of mobile terminals such as smartphones, tablet personal computers (PCs), laptop PCs, mobile game terminals, or digital cameras; fixed terminals such as television sets, printers, digital scanners, or network storage; or onboard terminals such as car navigation systems. The base station 100 and the extension units 101 to 103 may also be realized as machine type communication (MTC) terminals that perform machine-to-machine (M2M) communication, such as smart meters, automatic vending machines, remote monitoring devices, or point-of-sale (POS) terminals. The base station 100 and the extension units 101 to 103 may further be realized in the form of a wireless communication module (e.g., an integrated circuit module made up of a single die) to be mounted in the above-mentioned terminals.

Alternatively, the base station 100 may be realized as a wireless LAN access point (also known as a wireless base station) that may or may not be provided with a router function. As another alternative, the base station 100 may be realized as a mobile wireless LAN router. As a further alternative, the base station 100 may be a wireless communication module (e.g., an integrated circuit module made up of a single die) to be mounted in such equipment.

2-1. First Application

Figure 20:
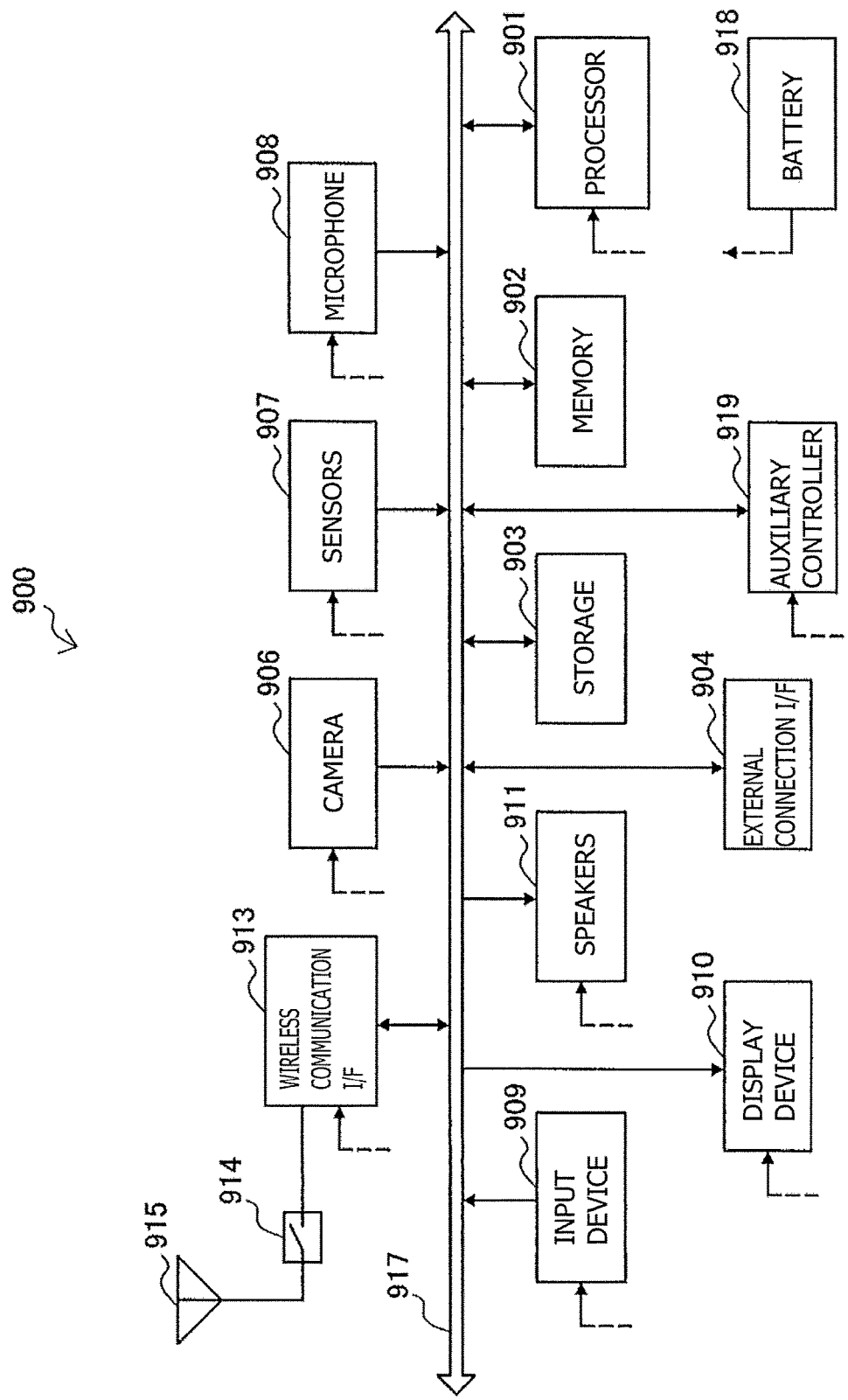
FIG. 20 is a block diagram depicting a schematic configuration example of a smartphone.

FIG. 20 is a block diagram depicting a schematic configuration example of a smartphone 900 to which the technology of the present disclosure may be applied. The smartphone 900 includes a processor 901, a memory 902, storage 903, an external connection interface 904, a camera 906, sensors 907, a microphone 908, an input device 909, a display device 910, speakers 911, a wireless communication interface 913, an antenna switch 914, an antenna 915, a bus 917, a battery 918, and an auxiliary controller 919.

The processor 901 may be a central processing unit (CPU) or a system on chip (SoC). The processor 901 controls the functions of the application layer and other layers of the smartphone 900. The memory 902 includes a random access memory (RAM) and a read-only memory (ROM) for storing data and the programs to be executed by the processor 901. The storage 903 may include storage media such as a semiconductor memory or a hard disk. The external communication interface 904 is an interface that connects an external device such as a memory card or a Universal Serial Bus (USB) device with the smartphone 900.

The camera 906 may have imaging elements such as charge-coupled devices (CCD) or complementary metal oxide semiconductors (CMOS) for generating captured images. The sensors 907 may include a group of sensors such as a positioning sensor, a gyro sensor, a geomagnetic sensor, and an acceleration sensor, for example. The microphone 908 converts the sound input to the smartphone 900 into an audio signal. The input device 909 includes a touch sensor that detects touches on a screen of the display device 910, a keypad, a keyboard, buttons, or switches for example, and receives operations or information input from the user. The display device 910 has a screen such as a liquid crystal display (LCD) or an organic light-emitting diode (OLED) display that displays images output from the smartphone 900. The speakers 911 convert an audio signal output from the smartphone 900 into sound.

The wireless communication interface 913 performs wireless communication by supporting at least one of the wireless LAN standards such as IEEE 802.11a, IEEE 802.11b, IEEE 802.11g, IEEE 802.11n, IEEE 802.11ac, and IEEE 802.11ad. In infrastructure mode, the wireless communication interface 913 can communicate with another device via a wireless LAN access point. In direct communication mode such as ad-hoc mode or Wi-Fi Direct mode, the wireless communication interface 913 can communicate directly with another device. In Wi-Fi Direct mode, unlike in ad-hoc mode, one of the two communicating terminals acts as an access point. Communication takes place directly between these terminals. Typically, the wireless communication interface 913 may include a baseband processor, a radio frequency (RF) circuit, and a power amplifier. The wireless communication interface 913 may be a one-chip module that integrates a memory for storing a communication control program, a processor for executing the program, and related circuits. In addition to the wireless LAN system, the wireless communication interface 913 may support other types of wireless communication systems such as near-field communication, close proximity communication system, or cellular communication. The antenna switch 914 switches the connection points of the antenna 915 to which to connect multiple circuits (e.g., for different wireless communication systems) included in the wireless communication interface 913. The antenna 915 has one or multiple antenna elements (e.g., those that make up a multi-input multi-output (MIMO) antenna), and is used by the wireless communication interface 913 for transmitting and receiving wireless signals.

The example in FIG. 20 is not limitative of how the smartphone 900 is configured. Alternatively, the smartphone 900 may have multiple antennas (e.g., one for wireless LAN, one for the close proximity communication system, etc.). In this case, the antenna switch 914 may be omitted from the configuration of the smartphone 900.

The bus 917 interconnects the processor 901, memory 902, storage 903, external connection interface 904, camera 906, sensors 907, microphone 908, input device 909, display device 910, speakers 911, wireless communication interface 913, and auxiliary controller 919. The battery 918 supplies power to the blocks of the smartphone 900 depicted in FIG. 20 via feeder lines indicated partially by broken lines in the drawing. The auxiliary controller 919 activates minimal functions of the smartphone 900 in sleep mode, for example.

In the smartphone 900 depicted in FIG. 20, the control section 160 discussed above with reference to FIG. 2 may be implemented using the wireless communication interface 913. At least part of the above-described functions may be implemented using the processor 901 or auxiliary controller 919.

The smartphone 900 may operate as a wireless access point (software AP) by getting the processor 901 to execute the access point function on the application level. Alternatively, the wireless communication interface 913 may include a wireless access point function.

2-2. Second Application

Figure 21:
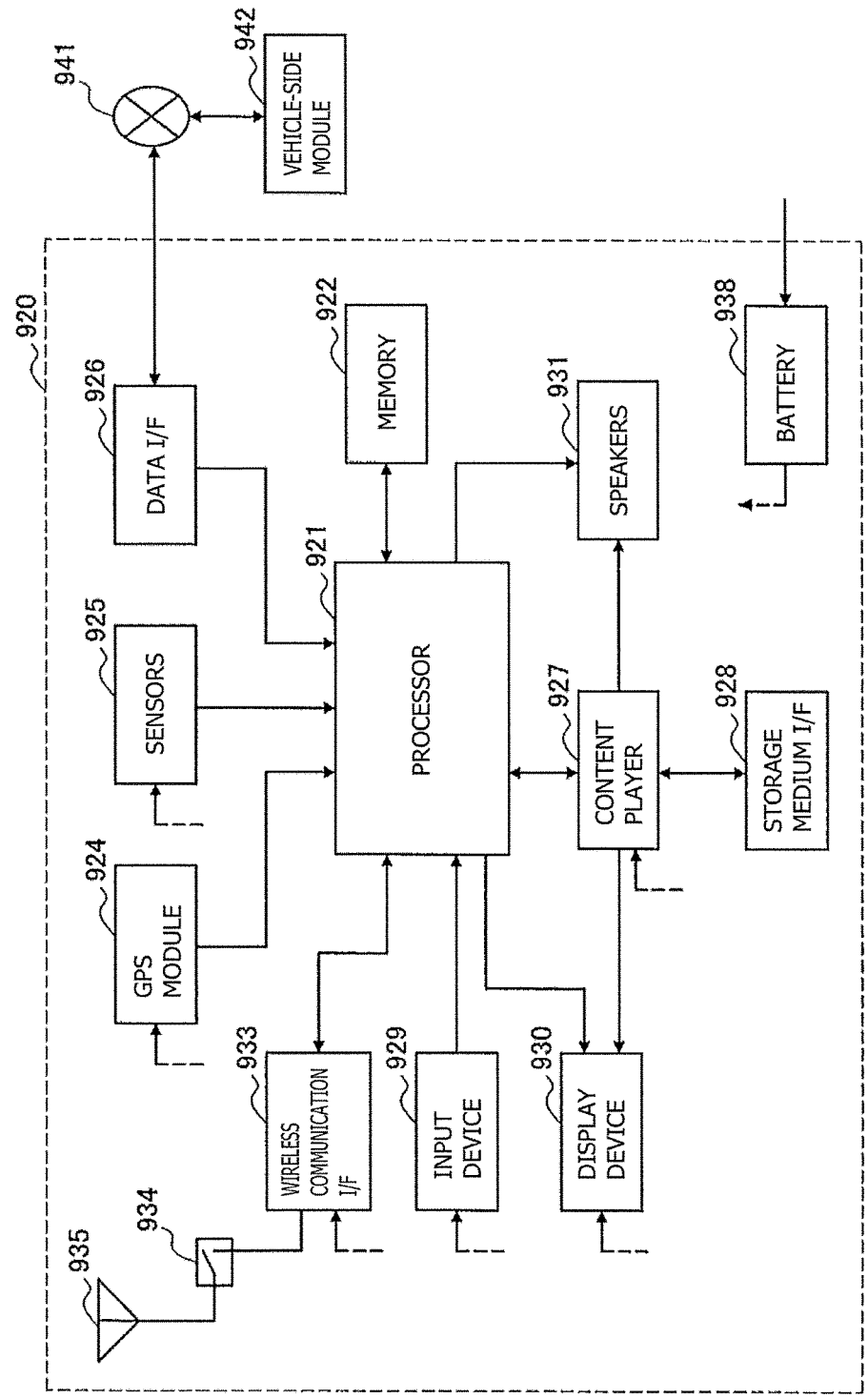
FIG. 21 is a block diagram depicting a schematic configuration example of a car navigation system.

FIG. 21 is a block diagram depicting a schematic configuration example of a car navigation system 920 to which the technology of the present disclosure may be applied. The car navigation system 920 includes a processor 921, a memory 922, a global positioning system (GPS) module 924, sensors 925, a data interface 926, a content player 927, a storage medium interface 928, an input device 929, a display device 930, speakers 931, a wireless communication interface 933, an antenna switch 934, an antenna 935, and a battery 938.

The processor 921 may be a CPU or a SoC, for example, which controls the car navigation function and other functions of the car navigation system 920. The memory 922 includes a RAM and a ROM for storing data and the programs to be executed by the processor 921.

The GPS module 924 measures the position of the car navigation system 920 (e.g., in latitude, longitude, and altitude) using GPS signals received from GPS satellites. The sensors 925 may include a group of sensors such as a gyro sensor, a geomagnetic sensor, and an atmospheric pressure sensor. The data interface 926 is connected, for example, to an onboard network 941 via a terminal, not depicted, and acquires data such as velocity data generated on the side of the vehicle.

The content player 927 reproduces content stored on a storage medium (e.g., CD or DVD) loaded into the storage medium interface 928. The input device 929 includes a touch sensor that detects touches on a screen of the display device 930, buttons, or switches, for example, and receives operations or information input from the user. The display device 930 has a screen such as an LCD or an OLED display that displays images from the navigation function or from the content being reproduced. The speakers 931 output sound from the navigation function or from the content being reproduced.

The wireless communication interface 933 performs wireless communication by supporting at least one of the wireless LAN standards such as IEEE 802.11a, IEEE 802.11b, IEEE 802.11g, IEEE 802.11n, IEEE 802.11ac, and IEEE 802.11ad. In infrastructure mode, the wireless communication interface 933 can communicate with another device via a wireless LAN access point. In direct communication mode such as ad-hoc mode or Wi-Fi Direct mode, the wireless communication interface 933 can communicate directly with another device. Typically, the wireless communication interface 933 may include a baseband processor, an RF circuit, and a power amplifier. The wireless communication interface 933 may be a one-chip module that integrates a memory for storing a communication control program, a processor for executing the program, and related circuits. In addition to the wireless LAN system, the wireless communication interface 933 may support other types of wireless communication systems such as near-field communication, close proximity communication system, or cellular communication. The antenna switch 934 switches the connection points of the antenna 935 to which to connect multiple circuits included in the wireless communication interface 933. The antenna 935 has one or multiple antenna elements and is used by the wireless communication interface 933 for transmitting and receiving wireless signals.

The example in FIG. 21 is not limitative of how the car navigation system 920 is configured. Alternatively, the car navigation system 920 may have multiple antennas. In this case, the antenna switch 934 may be omitted from the configuration of the car navigation system 920.

The battery 938 supplies power to the blocks of the car navigation system 920 depicted in FIG. 21 via feeder lines indicated partially by broken lines in the drawing. The battery 938 further stores power fed from the side of the vehicle.

In the car navigation system 920 depicted in FIG. 21, the control section 160 discussed above with reference to FIG. 2 may be implemented using the wireless communication interface 933. At least part of the above-described functions may be implemented using the processor 921.

The wireless communication interface 933 may operate as the above-described base station (information processing device) 100, providing wireless connection to the terminal held by the user riding in the vehicle.

The technology of the present disclosure may be implemented in the form of an onboard system (or vehicle) 940 including at least one block of the above-described car navigation system 920, the onboard network 941, and a vehicle-side module 942. The vehicle-side module 942 generates vehicle-side data such as engine revolutions or failure information and outputs the generated data onto the onboard network 941.

2-3. Third Application

Figure 22:
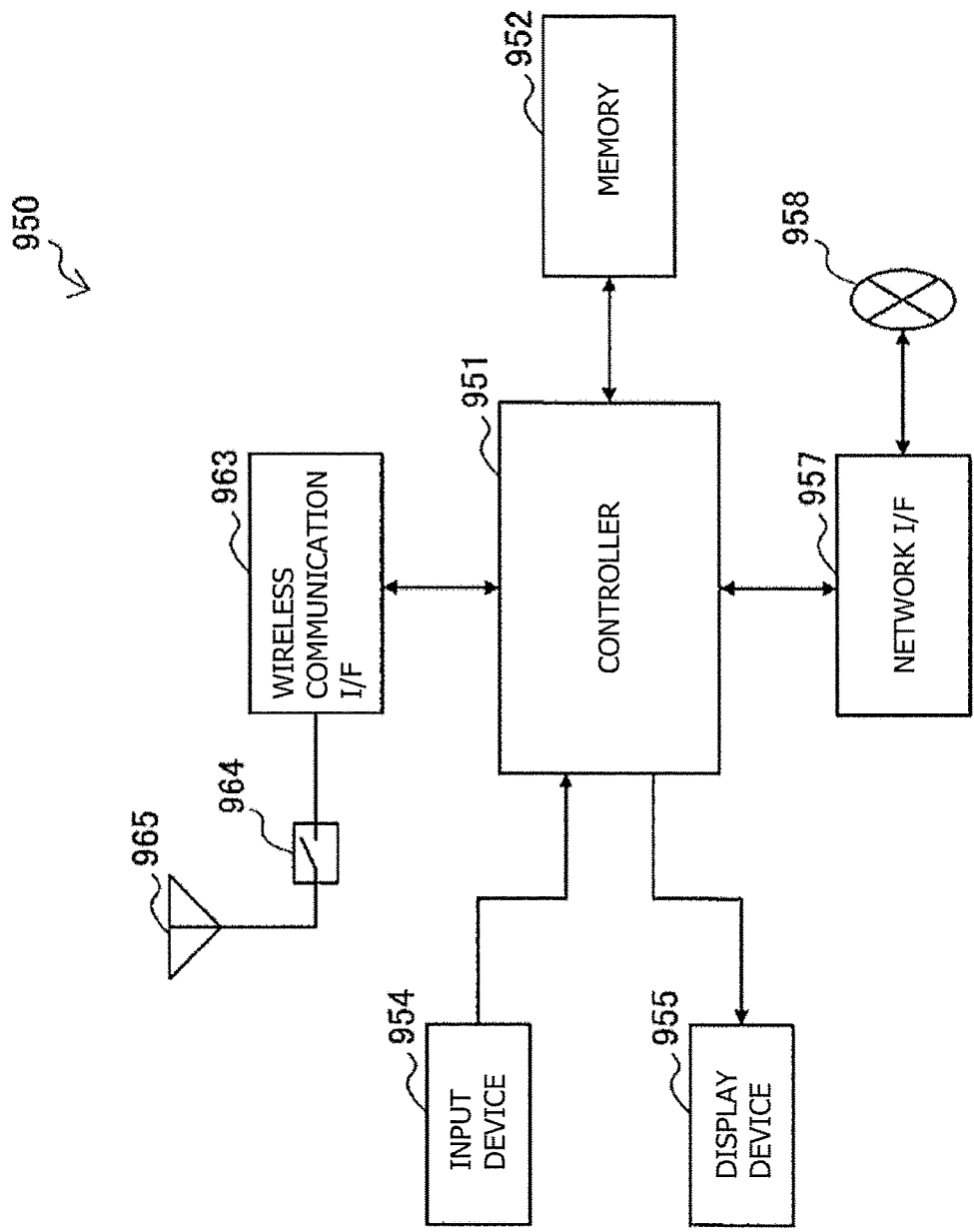
FIG. 22 is a block diagram depicting a schematic configuration example of a wireless access point.

FIG. 22 is a block diagram depicting a schematic configuration example of a wireless access point 950 to which the technology of the present disclosure may be applied. The wireless access point 950 includes a controller 951, a memory 952, an input device 954, a display device 955, a network interface 957, a wireless communication interface 963, an antenna switch 964, and an antenna 965.

The controller 951 may be a CPU or a digital signal processor (DSP), for example. The controller 951 activates the diverse functions of the Internet Protocol (IP) layer and upper layers of the wireless access point 950 (e.g., access restriction, routing, encryption, firewall, and log management). The memory 952 includes a RAM and a ROM and stores the programs to be executed by the controller 951 as well as various control data (e.g., terminal list, routing table, encryption keys, security settings, and logs).

The input device 954 includes buttons or switches, for example, and receives operations made by the user. The display device 955 includes LED lamps displaying the operating status of the wireless access point 950.

The network interface 957 is a wired communication interface for connecting the wireless access point 950 to a wired communication network 958. The network interface 957 may include multiple connection terminals. The wired communication network 958 may be a LAN such as the Ethernet (registered trademark) or a wide area network (WAN).

The wireless communication interface 963 supports at least one of the wireless LAN standards such as IEEE 802.11a, IEEE 802.11b, IEEE 802.11g, IEEE 802.11n, IEEE 802.11ac, and IEEE 802.11ad. The wireless communication interface 963 acting as an access point provides wireless connection for nearby terminals. Typically, the wireless communication interface 963 may include a baseband processor, an RF circuit, and a power amplifier. The wireless communication interface 963 may be a one-chip module that integrates a memory for storing a communication control program, a processor for executing the program, and related circuits. The antenna switch 964 switches the connection points of the antenna 965 to which to connect multiple circuits included in the wireless communication interface 963. The antenna 965 has one or multiple antenna elements and is used by the wireless communication interface 963 for transmitting and receiving wireless signals.

In the wireless access point 950 depicted in FIG. 22, the control section 160 discussed above with reference to FIG. 2 may be implemented using the wireless communication interface 963. At least part of the above-described functions may be implemented using the controller 951.

The embodiments described above are merely examples in which the present technology may be implemented. The particulars of the embodiments correspond basically to the inventive matters claimed in the appended claims. Likewise, the inventive matters named in the appended claims correspond basically to the particulars of the embodiments with the same names in the foregoing description of the preferred embodiments of the present technology. However, these embodiments and other examples are not limitative of the present technology that may also be implemented using various modifications and alterations of the embodiments so far as they are within the scope of the appended claims.

The procedures discussed above in connection with the embodiments may be construed as constituting a method having a series of such procedures. Also, the procedures may be construed as forming a program for causing a computer to execute a series of such procedures, or as constituting a recording medium storing such a program. The recording medium may be a Compact Disc (CD), a MiniDisc (MD), a Digital Versatile Disc (DVD), a memory card, or a Blu-ray Disc (registered trademark), for example.

The advantageous effects mentioned in this description are only examples and not limitative of the present disclosure. Further advantages will become apparent from a reading of the present disclosure.

The present technology may be configured preferably as follows:

(1)

An information processing device including: a control section configured in such a manner that if another device that can receive data from a device of a data transmission source without transmitting thereto notification information indicating that the other device can receive the data upon transition from a function pause state to a data receivable state is determined to be able to receive the data, the control section performs control to transmit the data to the other device without receiving the notification information therefrom.

(2)

The information processing device as stated in paragraph (1) above, in which the control section performs control to transmit the data to the other device at the time the other device is determined to have transitioned from the function pause state to the data receivable state.

(3)

The information processing device as stated in paragraph (1) or (2) above, in which the control section determines that the other device has transitioned from the function pause state to the data receivable state on the basis of information communicated beforehand from the other device, the information being about a cycle in which the function pause state is exited.

(4)

The information processing device as stated in any one of paragraphs (1) to (3) above, in which the control section performs control to notify the other device that the data will be transmitted thereto at the time the other device is determined to have transitioned from the function pause state to the data receivable state.

(5)

The information processing device as stated in paragraph (4) above, in which the control section gives the notification using a beacon frame or another frame transmitted after the beacon frame.

(6)

The information processing device as stated in paragraph (4) or (5) above, in which, if the control section transmits the data to multiple other devices, the control section gives the notification to all these devices.

(7)

The information processing device as stated in any one of paragraphs (4) to (6) above, in which the control section gives the notification using a bitmap generated on the basis of a partial virtual bitmap (PVB).

(8)

The information processing device as stated in any one of paragraphs (1) to (7) above, in which the control section performs control to notify the other device of at least either a transmission method or a transmission timing for performing the data transmission, in addition to information indicating that the data will be transmitted to the other device at the time the other device is determined to have transitioned from the function pause state to the data receivable state.

(9)

The information processing device as stated in paragraph (8) above, in which the control section notifies the other device of the transmission method in terms of at least either a frequency channel to be used for the data transmission in frequency division multiplex or the number of packets destined for the other device from among aggregated packets to be transmitted.

(10)

An information processing device including: a control section configured in such a manner as to notify another device beforehand that the information processing device can receive data from a device of a data transmission source without transmitting thereto notification information indicating that the information processing device can receive data upon transition from a function pause state to a data receivable state, the control section further performing control to receive the data from the other device at the time the information processing device transitions from the function pause state to the data receivable state.

(11)

The information processing device as stated in paragraph (10) above, in which the control section performs control to receive the data from the other device after receiving therefrom information indicating that the data will be transmitted at the time the information processing device transitions from the function pause state to the data receivable state.

(12)

The information processing device as stated in paragraph (10) or (11) above, in which, if at least either a transmission method or a transmission timing in which the other device transmits the data is designated, the control section performs control to wait for receiving the data from the other device in accordance with at least either the designated transmission method or the designated transmission timing.

(13)

The information processing device as stated in paragraph (12) above, in which, if the transmission method is designated in terms of a frequency channel to be used for the data transmission in frequency division multiplex, the control section performs control to receive the data transmitted on the designated frequency channel in the frequency division multiplex.

(14)

The information processing device as stated in paragraph (12) above, in which, if the transmission method is designated in terms of the number of packets destined for the information processing device from among aggregated packets to be transmitted, the control section performs control to receive the packets destined for the information processing device until the designated number of packets is reached, the control section further causing the information processing device to transition to the function pause state after the reception.

(15)

The information processing device as stated in any one of paragraphs (12) to (14) above, in which, if the transmission timing is designated, the control section performs control to cause the information processing device to transition to the function pause state except at the designated transmission timing.

(16)

A communication system including:

a first information processing device; and a second information processing device;

in which the first information processing device is configured in such a manner as to notify the second information processing device that the first information processing device can receive data from a device of a data transmission source without transmitting thereto notification information indicating that the first information processing device can receive data upon transition from a function pause state to a data receivable state, the first information processing device further receiving the data from the second information processing device at the time the first information processing device transitions from the function pause state to the data receivable state; and the second information processing device is configured in such a manner that if the first information processing device is determined to be in the data receivable state, the second information processing device transmits the data to the first information processing device without receiving the notification information therefrom.

(17)

An information processing method for use with an information processing device, the method including:

a control procedure of, if another device that can receive data from a device of a data transmission source without transmitting thereto notification information indicating that the other device can receive the data upon transition from a function pause state to a data receivable state is determined to be able to receive the data, performing control to transmit the data to the other device without receiving the notification information therefrom.

(18)

An information processing method for use with an information processing device, the method including:

a notification procedure of notifying another device beforehand that the information processing device can receive data from a device of a data transmission source without transmitting thereto notification information indicating that the information processing device can receive the data upon transition from a function pause state to a data receivable state; and a control procedure of performing control to receive the data from the other device at the time the information processing device transitions from the function pause state to the data receivable state.

(19)

A program for causing a computer of an information processing device to execute:

a control procedure of, if another device that can receive data from a device of a data transmission source without transmitting thereto notification information indicating that the other device can receive the data upon transition from a function pause state to a data receivable state is determined to be able to receive the data, performing control to transmit the data to the other device without receiving the notification information therefrom.

(20)

A program for causing a computer of an information processing device to execute:

a notification procedure of notifying another device beforehand that the information processing device can receive data from a device of a data transmission source without transmitting thereto notification information indicating that the information processing device can receive the data upon transition from a function pause state to a data receivable state; and a control procedure of performing control to receive the data from the other device at the time the information processing device transitions from the function pause state to the data receivable state.

REFERENCE SIGNS LIST

10 Communication system
100 Base station (information processing device)
101 to 103 Extension unit (information processing device)
110 Data processing section
120 Signal processing section
130 Wireless interface section
140 Antenna
150 Storage section
160 Control section
900 Smartphone
901 Processor
902 Memory
903 Storage
904 External connection interface
906 Camera
907 Sensors
908 Microphone
909 Input device
910 Display device
911 Speakers
913 Wireless communication interface
914 Antenna switch
915 Antenna
917 Bus
918 Battery
919 Auxiliary controller
920 Car navigation system
921 Processor
922 Memory
924 GPS module
925 Sensors 926 Data interface
927 Content player
928 Storage medium interface
929 Input device
930 Display device
931 Speakers
933 Wireless communication interface
934 Antenna switch
935 Antenna
938 Battery
941 Onboard network
942 Vehicle-side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing device comprising:
control circuitry configured in such a manner that if another device is configured to receive data from a device of a data transmission source without transmitting to the device of the data transmission source notification information indicating that the other device is configured to receive the data upon transition from a function pause state to a data receivable state is determined to be configured to receive the data, the control circuitry performs control to transmit the data to the other device without receiving the notification information from the other device,
wherein the control circuitry is configured to perform control to notify the other device of a transmission method for performing the data transmission, in addition to information indicating that the data will be transmitted to the other device at the time the other device is determined to have transitioned from the function pause state to the data receivable state.

2. The information processing device according to claim 1, wherein the control circuitry performs control to transmit the data to the other device at the time the other device is determined to have transitioned from the function pause state to the data receivable state.

3. The information processing device according to claim 1, wherein the control circuitry determines that the other device has transitioned from the function pause state to the data receivable state on the basis of information communicated beforehand from the other device, the information is regarding a cycle in which the function pause state is exited.

4. The information processing device according to claim 1, wherein the control circuitry performs control to notify the other device that the data will be transmitted thereto at the time the other device is determined to have transitioned from the function pause state to the data receivable state.

5. The information processing device according to claim 4, wherein the control circuitry gives the notification using a beacon frame or another frame transmitted after the beacon frame.

6. The information processing device according to claim 4, wherein, if the control circuitry transmits the data to a plurality of the other devices, the control circuitry gives the notification to all the other devices.

7. The information processing device according to claim 4, wherein the control circuitry gives the notification using a bitmap generated on the basis of a partial virtual bitmap.

8. The information processing device according to claim 1, wherein the control circuitry performs control to notify the other device of a transmission timing for performing the data transmission, in addition to the information indicating that the data will be transmitted to the other device at the time the other device is determined to have transitioned from the function pause state to the data receivable state.

9. The information processing device according to claim 8, wherein the control circuitry notifies the other device of the transmission method in terms of at least either a frequency channel to be used for the data transmission in frequency division multiplex or the number of packets destined for the other device from among aggregated packets to be transmitted.

10. An information processing device comprising:
a control circuitry configured in such a manner as to notify another device beforehand that the information processing device is configured to receive data from a device of a data transmission source without transmitting to the device of the data transmission source notification information indicating that the information processing device is configured to receive data upon transition from a function pause state to a data receivable state, the control circuitry further performing control to receive the data from the other device at the time the information processing device transitions from the function pause state to the data receivable state,
wherein the control circuitry is configured to perform control to notify the other device of a transmission method for performing the data transmission, in addition to information indicating that the data will be transmitted to the other device at the time the other device is determined to have transitioned from the function pause state to the data receivable state.

11. The information processing device according to claim 10, wherein the control circuitry performs control to receive the data from the other device after receiving therefrom information indicating that the data will be transmitted at the time the information processing device transitions from the function pause state to the data receivable state.

12. The information processing device according to claim 10, wherein, if at least either a transmission method or a transmission timing in which the other device transmits the data is designated, the control circuitry performs control to wait for receiving the data from the other device in accordance with at least either the designated transmission method or the designated transmission timing.

13. The information processing device according to claim 12, wherein, if the transmission method is designated in terms of a frequency channel to be used for the data transmission in frequency division multiplex, the control circuitry performs control to receive the data transmitted on the designated frequency channel in the frequency division multiplex.

14. The information processing device according to claim 12, wherein, if the transmission method is designated in terms of the number of packets destined for the information processing device from among aggregated packets to be transmitted, the control circuitry performs control to receive the packets destined for the information processing device until the designated number of packets is reached, the control circuitry further causing the information processing device to transition to the function pause state after the reception.

15. The information processing device according to claim 12, wherein, if the transmission timing is designated, the control circuitry performs control to cause the information processing device to transition to the function pause state except at the designated transmission timing.

16. An information processing method for use with an information processing device, the method comprising:

a control procedure of, if another device that is configured to receive data from a device of a data transmission source without transmitting to the device of the data transmission source notification information indicating that the other device is configured to receive the data upon transition from a function pause state to a data receivable state is determined to be configured to receive the data, performing control to transmit the data to the other device without receiving the notification information from the other device; and performing control to notify the other device of a transmission method for performing the data transmission, in addition to information indicating that the data will be transmitted to the other device at the time the other device is determined to have transitioned from the function pause state to the data receivable state.

17. An information processing method for use with an information processing device, the method comprising:

a notification procedure of notifying another device beforehand that the information processing device is configured to receive data from a device of a data transmission source without transmitting to the device of the data transmission source notification information indicating that the information processing device is configured to receive the data upon transition from a function pause state to a data receivable state; and a control procedure of performing control to receive the data from the other device at the time the information processing device transitions from the function pause state to the data receivable state; and performing control to notify the other device of a transmission method for performing the data transmission, in addition to information indicating that the data will be transmitted to the other device at the time the other device is determined to have transitioned from the function pause state to the data receivable state.

* * * * *